US012812215B2

(12) United States Patent
Killoran, Jr. et al.

(10) Patent No.: US 12,812,215 B2
(45) Date of Patent: Nov. 24, 2026

(54) SYSTEM AND METHOD FOR INTERACTIVE TELEVISION WITH MESSAGING BASED PAYMENTS

(71) Applicant: SWOOP IP HOLDINGS LLC, Wilmington, DE (US)

(72) Inventors: John P. Killoran, Jr., Albuquerque, NM (US); Patrick L. Killoran, Jackson Heights, NY (US)

(73) Assignee: SWOOP IP HOLDINGS LLC, Wilmington, DE (US)

( * ) Notice: Subject to any disclaimer, the term of this patent is extended or adjusted under 35 U.S.C. 154(b) by 584 days.

(21) Appl. No.: 18/088,672

(22) Filed: Dec. 26, 2022

(65) Prior Publication Data

US 2023/0132231 A1 Apr. 27, 2023

Related U.S. Application Data

(63) Continuation of application No. 15/255,547, filed on Sep. 2, 2016, now Pat. No. 11,553,252.

(60) Provisional application No. 62/213,319, filed on Sep. 2, 2015.

(51) Int. Cl.

| | |
|---|---|
| ***H04N 21/478*** | (2011.01) |
| ***G06Q 30/0601*** | (2023.01) |
| ***H04N 21/4784*** | (2011.01) |
| ***H04N 21/488*** | (2011.01) |

(Continued)

(52) U.S. Cl.

CPC ................ *H04N 21/47815* (2013.01); *G06Q 30/0611* (2013.01); *H04N 21/4784* (2013.01); *H04N 21/4882* (2013.01); *H04N 21/6125* (2013.01); *H04N 21/8586* (2013.01)

(58) Field of Classification Search

None

See application file for complete search history.

(56) References Cited

U.S. PATENT DOCUMENTS

| | | | | |
|---|---|---|---|---|
| 6,101,485 | A | 8/2000 | Fortenberry et al. | |
| 6,167,435 | A * | 12/2000 | Druckenmiller | H04L 61/35 709/224 |
| 8,538,845 | B2 | 9/2013 | Liberty | |

(Continued)

OTHER PUBLICATIONS

Clifford, Stephanie, "Scan-to-Buy Gets a Trial on Television" The New York times. Oct. 7, 2011. Wayback machine. Retrieved on Nov. 3, 2022. Retrieved from: <https://web.archive.org/web/20111010195459/https://www.nytimes.com/2011/10/08/technology/hsn-tests-onscreen-qr-codes-to-encourage-sales.html#expand>. (Year: 2011).

(Continued)

*Primary Examiner* — Patrick Mcatee
*Assistant Examiner* — Jason B Fenstermacher
(74) *Attorney, Agent, or Firm* — VOLPE KOENIG

(57) ABSTRACT

Disclosed is a system and method for integrating email, SMS, and social media based transactions with interactive television or standard cable with Internet access to make payments. Disclosed is a method to tie together a vendor and a cable provider with an e-commerce system leveraging each entity's customer information to streamline the payment process. Also disclosed are multiple methods to allow customers to make messaging based payments via interactive cable television features. The messaging allows for payments based on various levels of convergence between Internet and cable television experiences.

20 Claims, 20 Drawing Sheets

800

Email Request

(51) Int. Cl.
*H04N 21/61* (2011.01)
*H04N 21/858* (2011.01)

(56) References Cited

U.S. PATENT DOCUMENTS

| | | | | |
|---|---|---|---|---|
| 8,606,703 | B1 | 12/2013 | Dorsey et al. | |
| 8,725,635 | B2 | 5/2014 | Klein et al. | |
| 8,762,272 | B1 | 6/2014 | Cozens et al. | |
| 9,189,785 | B2 | 11/2015 | Liberty et al. | |
| 9,202,207 | B2 | 12/2015 | Dorsey | |
| 9,208,488 | B2 | 12/2015 | Liberty | |
| 9,832,532 | B1 | 11/2017 | Agabob | |
| 9,892,386 | B2 | 2/2018 | Liberty | |
| 10,395,223 | B2 | 8/2019 | Muthu et al. | |
| 10,515,345 | B2 | 12/2019 | Koh et al. | |
| 2006/0168057 | A1* | 7/2006 | Warren | H04L 51/212 709/206 |
| 2006/0200523 | A1* | 9/2006 | Tokuda | H04L 51/48 709/206 |
| 2006/0253335 | A1 | 11/2006 | Keena et al. | |
| 2007/0255620 | A1 | 11/2007 | Tumminaro et al. | |
| 2009/0006233 | A1 | 1/2009 | Chemtob | |
| 2009/0282108 | A1* | 11/2009 | Sachtjen | H04L 51/04 709/206 |
| 2010/0070419 | A1 | 3/2010 | Vadhri | |
| 2010/0175084 | A1 | 7/2010 | Ellis | |
| 2012/0130851 | A1 | 5/2012 | Minnick | |
| 2012/0130898 | A1 | 5/2012 | Snyder et al. | |
| 2012/0253896 | A1* | 10/2012 | Killoran, Jr. | G06Q 30/0258 705/14.4 |
| 2013/0198018 | A1* | 8/2013 | Baig | G06Q 20/209 705/16 |
| 2013/0275264 | A1* | 10/2013 | Lindenberg | G06Q 20/322 705/26.1 |
| 2014/0046748 | A1* | 2/2014 | Nagarajan | G06Q 30/02 705/14.1 |
| 2014/0189820 | A1* | 7/2014 | Pieczul | G06F 21/31 726/5 |
| 2014/0222624 | A1 | 8/2014 | Custer | |
| 2014/0279447 | A1* | 9/2014 | Dorsey | G06Q 20/023 705/39 |
| 2015/0269566 | A1* | 9/2015 | Gaddam | G06Q 20/385 705/67 |
| 2016/0044383 | A1* | 2/2016 | Bonvolanta | H04N 21/2542 725/34 |

OTHER PUBLICATIONS

"QR Code." Britannica Academic, Encyclopaedia Britannica, Feb. 6, 2012. academiceb.com/levels/collegiate/article/QR-Code/574116. Accessed Aug. 25, 2022. (Year: 2012).

D. Das, P. Sinha, A. Ghose and C. Bhaumik, "An interactive system using digital broadcasting and Quick Response code," 2011 IEEE 15th International Symposium Consumer Electronics (ISCE), 2011, pp. 397-400, doi: 10.1109/ISCE.2011.5973857. (Year: 2011).

* cited by examiner

880

900

1000

1100

1150

1200

1240

SYSTEM AND METHOD FOR INTERACTIVE TELEVISION WITH MESSAGING BASED PAYMENTS

CROSS REFERENCE TO RELATED APPLICATION

This application is a continuation of U.S. patent application Ser. No. 15/255,547 filed Sep. 2, 2016 and claims the benefit of U.S. provisional application No. 62/213,319 filed Sep. 2, 2015, which are incorporated by reference as if fully set forth.

FIELD OF INVENTION

The present invention is related to electronic commerce systems. More particularly, the present invention is a system and method that aids management of a vendor and a customer and facilitates messaging based payments via an interactive cable television.

BACKGROUND

Cable providers deliver cable and Internet access to their customers. The barrier between cable and Internet is diminishing and promises to continue to lessen in the future. Customers favor the capacity to navigate between cable and Internet and to do so using more than one device. However, making payments with ease and efficiency in both has yet to be defined. A system that allows for payments to be made via messaging in cable and Internet would represent a great convenience for the customer.

Currently, cable providers deliver a limited level of interactivity to their customers. Vendors can promote their products to customers through the cable provider by having the customer access additional information and request a sales contact via the converter box. Vendors can retrieve customer information and then contact them about their product. A system that can streamline this process and contact the customer immediately by email, SMS or social media with an option to make a purchase would be welcome in the market place.

SUMMARY

Disclosed is a system and method for integrating email, SMS, and social media based transactions with interactive television or standard cable with Internet access using the @Pay Email Payment Gateway to make payments in both arenas. Disclosed is a method to tie together a vendor and a cable provider with the e-commerce system leveraging each party's customer information to streamline the payment process. Also disclosed are multiple methods to allow customers to make messaging based payments via interactive cable television. These manifold forms of messaging allow for payments based on various levels of convergence between Internet and cable television experiences.

A system and method for interactive television with email based payments in an e-commerce system is disclosed. The system and method include receiving a request for an offer message from a user via a cable provider system, generating the offer message including a token embedded into a mailto link, sending the offer message to the user, receiving a response message from the user, wherein the response message is generated when the user selects the mailto link in the offer message, and authenticating the response message and decoding the token, and processing the payment.

A system and method for interactive television with email based payments in an e-commerce system is disclosed. The system and method include receiving a request for an offer message from a vendor via a cable provider system, generating the offer message including a token embedded into a mailto link, sending the offer message to the cable provider system, receiving a response message from a customer, wherein the response message is generated when the user selects the mailto link in the offer message, authenticating the response message and decoding the token, and processing the payment.

A system and method for interactive television with email based payments in an e-commerce system is disclosed. The system and method include sharing an offer for web-checkout with a customer via a cable provider system, receiving a request for email checkout from the customer, totaling items in the web-checkout of the customer, generating the offer message including a token embedded into a mailto link, receiving a response message from a customer, wherein the response message is generated when the user selects the mailto link in the offer message, authenticating the response message, and processing the payment.

The offer message may be responsive to a request from the user via the cable provider. The offer message may be responsive to a vendor sharing the offer to the cable provider.

The authenticating of the response message may be based on the address where the response message originated.

The response message may be an email message. The response message may be a Short Message Service (SMS) message.

The user may be a customer using a customer device.

BRIEF DESCRIPTION OF THE DRAWINGS

A more detailed understanding may be had from the following description, given by way of example in conjunction with the accompanying drawings wherein.

DETAILED DESCRIPTION OF THE PREFERRED EMBODIMENTS

Figure 1:
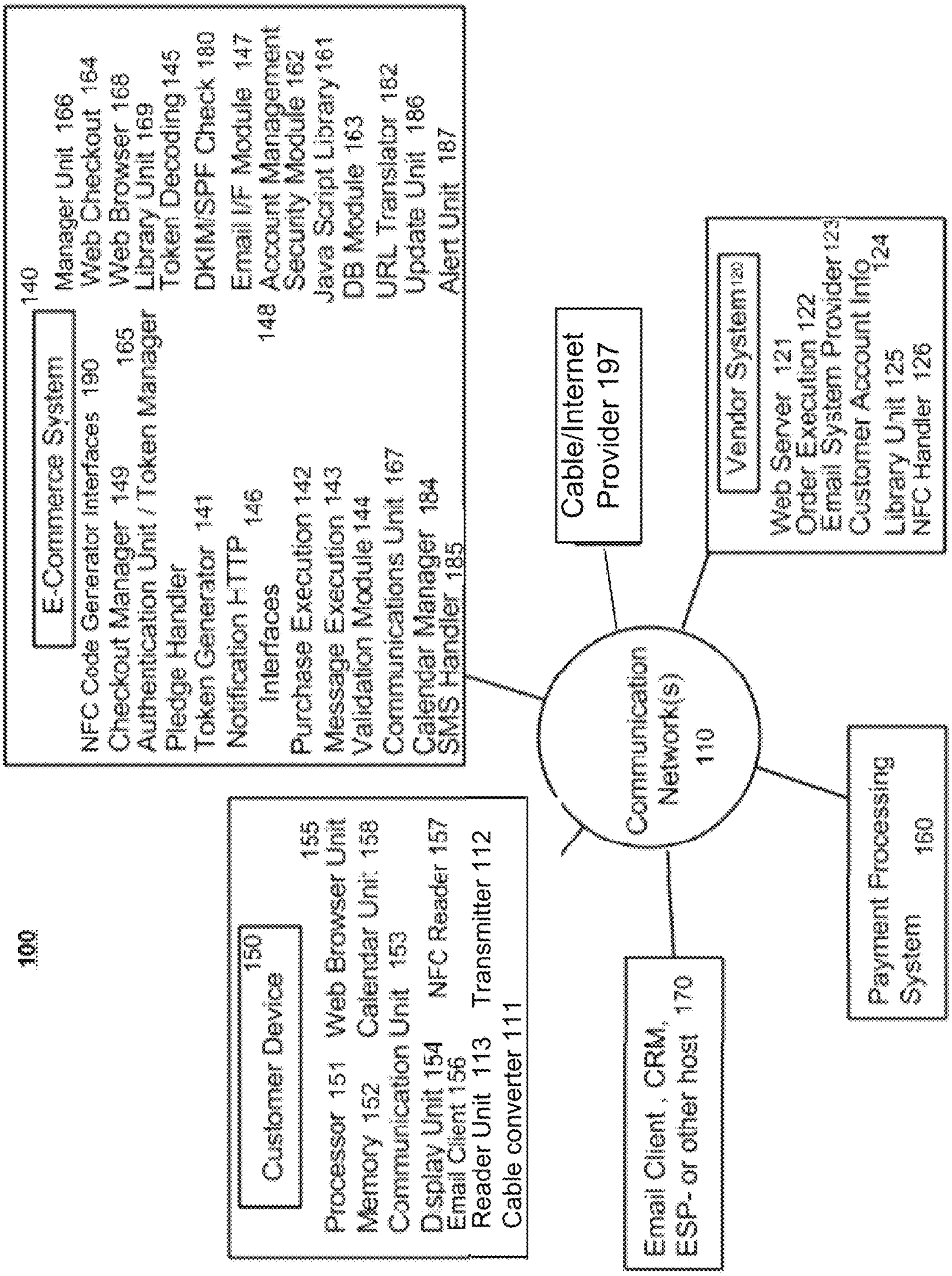
FIG. 1 illustrates a system diagram of an Email-Based E-commerce System.

All embodiments described below may be integrated with an email service provider, customer relationship management, or directly with a payment processor. Payment processing may occur in any number of ways using multiple gateways, credit cards, debit cards, direct carrier billing, and automatic clearinghouse. Although the description below focuses on the use of email messaging, social media, and SMS, other networks may also be substituted. The configuration of the Email Payment Gateway (also referred to as the e-commerce system) may vary based on client needs. A method and system allow vendors to send emails to customers where customers may make payments for specific amounts by selecting mailto links that are associated with each amount and sending the email to the e-commerce system. Each mailto link may hold a token generated by the e-commerce system. The e-commerce system may authenticate the email and decode the token. The disclosed design solves several problems in relation to making payments while watching television. Although optimized for cable television the described invention may be applied to satellite television. The e-commerce system provides vendors with a series of controls that manage and streamline the process of registering customers.

The embodiments described below may also be integrated with an email service provider, customer relationship management, or directly with a payment processor. Payment processing may occur in any number of ways using multiple gateways, banks, credit cards, debit cards, gift cards, direct carrier billing, automatic clearing houses, or virtual currency. Although the description below focuses on the use of email, Short Message Service (SMS), and social media networks may also be used. Although some examples and discussion herein generally use SMS, other texting formats may be substituted for SMS including Extensible Markup Language (XMPP), Session Initiation Protocol (SIP), Voice over Internet Protocol (ViOP), multimedia messaging service (MMS), Messaging Queuing Telemetry Transport (MQTT), and Apple Push Notification Service (APNS) used in services such as Whatsapp, Viber, Facebook Messenger, iMessage and other forms Internet Telephony Protocols. The configuration of the system may vary accordingly.

One function of an Email Payment Gateway may be to generate payment tokens and then to decode the tokens when sent back to the gateway. An email with a token usually provides the information required for the completion of a transaction. This method often requires the management of numerous tokens and an inflexible process for vendors. A system that limits the amount of information in a token, for example, a minimum amount, or requires no tokens at all, and pulls additional required information automatically from other sources would be welcome in the market place.

Cable providers allow customers to make a payment and place that charge on their cable bill. However, this process is limiting because more than one viewer may be watching the television. Cable providers can only charge the person who holds the cable television account. A system that integrates with the cable provider, where customers can enter email addresses or phone number and confirm via email, SMS, and social media would provide a competitive advantage.

The addition of the cable provider to the Email Payment Gateway provides another resource of customer information to a vendor relationship. Collecting the required information for a credit card transaction is often a deterrent to customers making a payment. Sharing customer information between the e-commerce system and vendor streamlines this process. Cable providers can add to this mix and offer vendors an even wider base of customers prepared to make shop, pay bills, and make donations. This would be a welcome addition to services offered by the cable provider.

A system and method for interactive television with email based payments in an e-commerce system is disclosed. The system and method include receiving a request for an offer message from a user via a cable provider system, generating the offer message including a token embedded into a mailto link, sending the offer message to the user, receiving a response message from the user, wherein the response message is generated when the user selects the mailto link in the offer message, and authenticating the response message and decoding the token, and processing the payment.

A system and method for interactive television with email based payments in an e-commerce system is disclosed. The system and method include receiving a request for an offer message from a vendor via a cable provider system, generating the offer message including a token embedded into a mailto link, sending the offer message to the cable provider system, receiving a response message from a customer, wherein the response message is generated when the user selects the mailto link in the offer message, authenticating the response message and decoding the token, and processing the payment.

A system and method for interactive television with email based payments in an e-commerce system is disclosed. The system and method include sharing an offer for web-checkout with a customer via a cable provider system, receiving a request for email checkout from the customer, totaling items in the web-checkout of the customer, generating the offer message including a token embedded into a mailto link, receiving a response message from a customer, wherein the response message is generated when the user selects the mailto link in the offer message, authenticating the response message, and processing the payment.

FIG. 1 illustrates a system diagram for integrating messaging based payments with interactive television and standard cable television (TV). Messaging based payments may include email, SMS, and social media based payments. These may include video kiosks or large format video advertisements as well as in home viewing. The disclosed methods provide different benefits based on the dynamic nature of the e-commerce system. The e-commerce system offers vendors multiple methods to authenticate an email. The e-commerce system also offers a flexible configuration of the system allowing the vendor or other third party to hold desired parts of the system in the vendor system. For example, token generation, which is depicted in FIG. 1 as being held by the e-commerce system, may be held by another party. When the vendor registers with the e-commerce system they are offered different levels of service and the vendor chooses the configuration required.

FIG. 1 illustrates a system diagram of an email-based website checkout system 100. The example system 100 shown in FIG. 1 may be used for e-commerce transactions. The example system 100 includes a customer device 150, a vendor server 120, an e-commerce system 140, a banking server (not shown), a payment processing system 160, and an email service provider 170 that may communicate over one or more wired and/or wireless communication networks 110. The wired or wireless communication networks 110 may be public, private or a combination of public or private networks.

The customer device 150 may be, for example, a cellular phone, a smartphone, a desktop computer, a laptop computer, a tablet computer, television or any other appropriate computing device. The customer device 150 may utilize short message service (SMS) messages, multimedia messaging service (MMS), social media apps, web browsing, and or email. For example, social media apps may include Facebook, Twitter, GooglePlus+, LinkedIn, Instagram, Pinterest, Swapchat, Tumblr, and the like. The customer device 150 includes a processor 151, memory 152, a communications unit 153, a display unit 154, a web browser unit 155, which may communicate data to/from the web server module(s) in the vendor server 120 and payment server 160, email client 156, and near field communication (NFC) reader 157. The web browser unit 155 may include and/or communicate with one or more sub-modules that perform functionality such as rendering HTML (including but not limited to HTML5), rendering raster and/or vector graphics, executing JAVASCRIPT, and/or rendering multimedia content.

Alternatively or additionally, the web browser unit 155 may implement Rich Internet Application (RIA) and/or multimedia technologies such as ADOBE FLASH and/or other technologies compatible with Internet based communications. The web browser unit 155 may implement RIA and/or multimedia technologies using one or web browser plug-in modules (e.g., ADOBE FLASH), and/or using one or more sub-modules within the web browser unit 155 itself. The web browser unit 155 may display data on one or more display devices (not depicted) that are included in, or connected to, the customer device 150, such as a liquid crystal display (LCD) display or monitor. The customer device 150 may receive an input from a user from an input device (not depicted) that is included in, or connected to, the customer device 150, such as a keyboard, a mouse, a microphone or a touch screen, and provide data that indicates the input to the web browser unit 155.

The display unit 154 may be a smart phone, computer screen or television.

The customer device 150 may also include a cable converter 111, transmitter 112, and reader unit 113. Cable converter 111 and transmitter 112 are shown within the customer device 150, although in certain situations cable converter 111 and transmitter 112, each individually or together may be located in other parts within the system 100. For example cable converter 111 and transmitter 112 may in certain implementations be located within vendor system 120, or even within a third party system, for example.

Cable converter 111 may be any form of electronics that converts transmitted or otherwise conveyed signals to those signal displayed on a television or other display. For example, cable converter 111 may be an electronic tuning device that transposes/converts any of the available channels from a cable television service to an analog RF signal on a single channel, usually VHF channel 3 or 4, or to a different output for digital televisions such as HDMI. Cable converter 111 may include descrambling to manage carrier-controlled access restriction to various channels. Cable-ready televisions and other cable-aware A/V devices such as video recorders can similarly convert cable channels to a regular television set, and the cable converter 111 is included within these devices. The task of cable converter 1111 is to convert a television channel from those transmitted over the CATV wire, for example.

Transmitter 112 is any transmitter that can transmit information including the described token or link within a defined distance to customer device 150 via reader unit 113.

The customer device 150 may also include a calendar unit or calendar application, and a messaging unit, also referred to as a SMS or social media application 159.

Calendar unit 158 may also include or be referred to as calendar software or a calendar application. Calendar unit 158 may include calendaring software that at least includes or provides users with an electronic version of a calendar. Additionally, the software may provide an appointment book, address book, and/or contact list. These tools are an extension of many of the features provided by time management software such as desk accessory packages and computer office automation systems. Calendaring is a standard feature of many PDAs, EDAs, and smartphones. The software may be stored or house locally on a computing device or customer device 150, often designed for individual use, e.g. Lightning extension for Mozilla Thunderbird, Microsoft Outlook without Exchange Server, or Windows Calendar, or may be a networked-based software that allows for the sharing of information between users, e.g. Mozilla Sunbird, Windows Live Calendar, Google Calendar, or Microsoft Outlook with Exchange Server.

SMS or social media application 159 may be any application that provides access to texting including SMS or to social media application wither directly or using a web link.

The vendor system 120 may include a web server 121, order execution unit 122, an email system provider 123, customer account info 124, a library unit 125, and an NFC handler 126. The vendor system may be substituted for a financial management system as illustrated in the examples described herein.

The web server 121 provides a website that may be accessed by a customer device 150. The web server 121 may implement HTTP protocol, and may communicate Hypertext Markup Language (HTML) pages and related data from the website to/from the customer device 150 using HTTP.

The vendor server 120 may be connected to one or more private or public networks (such as the Internet), via which the web server 121 communicates with devices such as the customer device 150. The web server 121 may generate one or more web pages, may communicate the web pages to the customer device 150, and may receive responsive information from the customer device 150.

The web server 121 may be, for example, an NGINX server, an APACHE HTTP server, a SUN-ONE Web Server, a MICROSOFT INTERNET Information Services (IIS) server, and/or may be based on any other appropriate HTTP server technology. The vendor server 120 may also include one or more additional components or modules (not depicted), such as one or more load balancers, firewall devices, routers, switches, and devices that handle power backup and data redundancy.

The vendor system 120 may also include one or more additional components or modules (not depicted), such as one or more load balancers, firewall devices, routers, switches, and devices that handle power backup and data redundancy.

The order execution unit 122 is configured to receive instructions included in received messages and executes orders on behalf of the vendor system 130.

The memory may be configured to store information associated with e-commerce transactions. This may include inventory information, information used to generate web pages, customer information, and other e-commerce data.

The e-commerce system 140 may include a token generator 141, a purchase execution module 142, a message execution module 143, a validation module 144, a database module 163, a token decoder 145, a notification HTTP module 146, an email interface module 147, an account management unit 148, checkout manager 149, web checkout 164, JAVA script library 161, a security module 162, authentication unit/token manager 165, manager unit 166, communications unit 167, web browser 168, libraries 169, DKIM/SPF check 180, a Universal Resource Locator (URL) translator 181, and an NFC code generator interface 190. While only one vendor system 120 is shown communicating with the e-commerce system 140, this is shown as an example only. The e-commerce system 140 may communicate with an internal or external email service provider (ESP) 170 and an internal or external payment processing system 160. The e-commerce system 140 may communicate with multiple vendor systems 120.

Similarly, vendors may register with the e-commerce system 140. The e-commerce system 140 may provide the vendor system 120 with a public key and private key to be used in token transaction in accordance with the methods described herein. When a transaction is attempted (e.g. for invoices and payments), the e-commerce system 140 decodes the token, authenticates the sender of the email, which may allow the transaction to be processed. While the e-commerce system 140 is depicted as a separate entity in FIG. 1, this is shown as an example only. The e-commerce system 140 may be controlled and/or co-located with the vendor system 130, and/or the email service provider 170.

The token generator 141 may generate tokens for use in e-commerce transactions. Tokens may be encrypted or plain text strings which contain information to perform a transaction when sent to the e-commerce system 140. A token may be one or multiple encrypted strings, files, passwords, cyphers, plain text or other data which may contain information used to perform or authenticate a transaction. While FIG. 1 shows the token generator 141 as being a part of the e-commerce system 140, it may be hosted by any trusted party with access to the private key. For example, the banking server may include a token generator 141. A token may include one or more of the following parameters or other parameters not listed below:

Private-key: The private key provided by the e-commerce system 140.

Public-key: E-commerce system's 140 public key, provided by the e-commerce system 140.

Auth-key: Any additional data that may be used to authenticate the transaction, including, but not limited to, biometric identification, location data and other fraud detection systems.

Partner-id: The partner ID given provided by the e-commerce system 140.

Environment: The environment the vendor wants to generate buttons for. This distinguishes whether the token is being used in a testing environment or in the live environment (and running real transactions).

Type: The type of token to generate (e.g. bulk, email-targeted, etc.). There are multiple types of tokens that a token generator 141 may generate and decode. For example, site tokens may be used for website transactions, email tokens for minimum-of-clicks email payments, and universal tokens for email validations.

Card: The card token associated with the recipient of this token. When a customer is registered with the e-commerce system 140, the vendor receives a credit card token—a unique identifier that references the specific card associated with that customer and vendor. When the vendor is generating a token to submit to e-commerce system 140, they may include the card token as a customer identifier.

Email: The email associated with the receipt of this token.

URL: The Signup URL the recipient may go to if customer doesn't have payment information registered with e-commerce system 140.

Amount: The amount a customer should be charged for the transaction the token is generated for.

User-data: Data to pass back as a reference. This data may include custom data that the vendor may want to pass through the e-commerce system 140 and receive back when a transaction has completed. It may include an item reference number or SKU, customer address, or other piece of data that is not required by e-commerce system 140 to complete a transaction, but that the vendor wants associated with that transaction.

Expires: Expiration date for token, integer value of seconds since epoch.

Header-user-agent: The HTTP_USER_AGENT from the request header. HTTP headers are sent as part of a request from a customer's web browser unit within customer device 150 for a piece of information. These headers define the parameters that the web browser unit is expecting to get back. The user-agent is the identifier of the software that is submitting the request—typically the identifier of the web browser unit that is requesting the content.

Header-accept-language: The HTTP_ACCEPT_LANGUAGE from the request header. The accept-language is the acceptable language for the response—e.g. the language in which the web browser unit is requesting the content be sent back.

Header-accept-charset: The HTTP_ACCEPT_CHARSET from the request header. The accept-charset is the character sets that are acceptable for the response—e.g. the character set in which the web browser unit is requesting the content be sent back.

IP-address: The IP address of the token recipient.

In one example, a bulk token may omit the card and email fields, thereby allowing for the tokens to be shared. Additionally, or alternatively, a bulk token may include the card field and/or email field but the e-commerce system 140 may be configured to ignore those fields and/or other fields based on the type field.

The purchase execution module 142 facilitates the execution of payments between a customer and a vendor.

The message execution module 143 is configured to analyze received messages and communicate with the token decoder 145 to determine if the received message is valid and to identify the request embedded in the message (e.g. request for purchase of goods.) If the token decoder 145 indicates the token is valid, the message execution module 143 may then access the account management unit 148 to verify a transaction.

The database module 163 serves as a database to store information that may be accessed by the e-commerce system 140.

The token decoder 145 may be configured to decode tokens received from external sources, such as a vendor system 120 or a customer device 150.

The validation module 144 may serve to authenticate received emails, using the DomainKeys Identified Mail (DKIM) and/or Sender Policy Framework (SPF) protocols. For example, SPF allows a domain owner to add a file or record on the server that the recipient server cross-checks. Similarly, DKIM may be used to embed information within the email. While these specific validation/authentication protocols are discussed herein, any known validation/authentication protocol may be used and the use of the DKIM/SPF protocol is used only to enhance the understanding of the reader by using a specific possible validation/authentication protocol.

Generally, SPF is an email validation system designed to detect email spoofing by providing a mechanism to allow receiving mail exchangers to check that incoming mail from a domain is being sent from a host authorized by that domain's administrators. The list of authorized sending hosts for a domain may be published in the Domain Name System (DNS) records for that domain in the form of a specially formatted TXT record. Sender Policy Framework is described in IETF publication RFC 7208, which is incorporated by reference as if fully set forth.

The Simple Mail Transfer Protocol (SMTP) permits any computer to send an email claiming to be from any source address. SPF allows the owner of an Internet domain to specify which computers are authorized to send email with sender addresses in that domain, using Domain Name System (DNS) records. Receivers verifying the SPF information in TXT records may reject messages from unauthorized sources before receiving the body of the message.

The sender address is transmitted at the beginning of the SMTP dialog. If the server rejects the sender, the unauthorized client should receive a rejection message, and if that client was a relaying message transfer agent (MTA), a bounce message to the original sending address may be generated. If the server accepts the sender, and subsequently also accepts the recipients and the body of the message, it should insert a Return-Path field in the message header in order to save the sender address.

Generally, DKIM is an email validation system designed to detect email spoofing by providing a mechanism to allow receiving mail exchangers to check that incoming mail from a domain is authorized by that domain's administrators. A digital signature included with the message may be validated by the recipient using the signer's public key published in the DNS. DKIM is the result of merging DomainKeys and Identified Internet Mail. Prominent email service providers implementing DKIM include Yahoo, Gmail, AOL and FastMail. Any mail from these organizations should carry a DKIM signature.

More specifically, both, signing and verifying modules are usually part of a mail transfer agent (MTA). The signing organization may be a direct handler of the message, such as the author, the originating sending site or an intermediary along the transit path, or an indirect handler such as an independent service that provides assistance to a direct handler. In most cases, the signing module acts on behalf of the author organization or the originating service provider by inserting a DKIM-Signature: header field. The verifying module typically acts on behalf of the receiver organization.

DKIM is independent of Simple Mail Transfer Protocol (SMTP) routing aspects in that it operates on the RFC 5322 message—the transported mail's header and body—not the SMTP envelope defined in RFC 5321. Hence, the DKIM signature survives basic relaying across multiple MTAs. DKIM allows the signer to distinguish its legitimate mail stream. This ability to distinguish legitimate mail from potentially forged mail has benefits for recipients of e-mail as well as senders, and "DKIM awareness" is programmed into some e-mail software.

The "DKIM-Signature" header field, by way of example, may include a list of "tag=value" parts. Tags are short, usually only one or two letters. The most relevant ones are b for the actual digital signature of the contents (headers and body) of the mail message, bh for the body hash, d for the signing domain, and s for the selector. The default parameters for the authentication mechanism are to use SHA-256 as the cryptographic hash and RSA as the public key encryption scheme, and encode the encrypted hash using Base64. The receiving SMTP server uses the domain name and the selector to perform a DNS lookup. For example, given the signature:

DKIM-Signature: v=1; a=rsa-sha256; d=example.net; s=brisbane;
c=relaxed/simple; q=dns/txt; 1=1234; t=1117574938; x=1118006938;
h=from:to:subject:date:keywords:keywords;
h=MTIzNDU2Nzg5MDEyMzQ1Njc4OTAxMjMONTY3ODkwMTI=;
b=dzdVyOfAKCdLXdJOc9G2q8LoXS1EniSbav+yuU4zGeeruD00lszZ VoG4ZHRNiYzR.

A verifier queries the TXT resource record type of brisbane._domainkey.example.net. The selector is a straightforward method to allow signers to add and remove keys whenever they wish—long lasting signatures for archival purposes are outside DKIM's scope. Some more tags are visible in the example:

v is the version,
a is the signing algorithm,
c is the canonicalization algorithm(s) for header and body,
q is the default query method,
l is the length of the canonicalized part of the body that has been signed,
t is the signature timestamp,
x is it's expire time, and
h is the list of signed header fields, repeated for fields that occur multiple times.

The DKIM-Signature header field itself is always implicitly included in h.

The data returned from the verifier query is also a list of tag-value pairs. It includes the domain's public key, along with other key usage tokens and flags. The receiver may use this to then decrypt the hash value in the header field and at the same time recalculate the hash value for the mail message (headers and body) that was received. If the two values match, this cryptographically proves that the mail was signed by the indicated domain and has not been tampered with in transit.

Signature verification failure does not force rejection of the message. Instead, the precise reasons why the authenticity of the message may not be proven should be made available to downstream and upstream processes. Methods for doing so may include sending back a message, or adding an Authentication-Results header field to the message as described in RFC 7001, which is incorporated as if fully set forth.

While DKIM and SPF protocols are discussed herein, validation module 144 may perform any authentication and validation type protocols. DKIM and SPF are used to provide examples of such validation protocols that may be performed in validation module 144.

The notification HTTP module 146 delivers notices of events to external systems, such as an HTTP endpoint the vendor configures to update their internal database when a transaction is executed.

An email interface module 147 may be configured to parse emails for action by the e-commerce system 140.

The account management unit 148 is configured to manage accounts registered with the e-commerce system 140. A customer or vendor, wishing to complete a transaction with an e-commerce system 140 may register his/her email address and payment information with the e-commerce system 140. The account management unit 148 may be configured to store a customer registry and a vendor registry.

The security module 162 may be configured to perform additional security measures to prevent unauthorized access to the system or fraud.

E-commerce system 140 may also include a pledge handler 183, a calendar manager or calendar application 184, a SMS handler 185, an update unit 186, and an alert unit 187. SMS handler 185 is a device or element within the e-commerce system 140 that can handle SMS communication and can receive, decode/encode SMS communications. An update unit 186 provides updates within the e-commerce system 140. Alert unit 187 is a unit that provides alerts within the e-commerce system 140.

Pledge handler 183 is an element designed to handle pledges. This may include the portion of the system that receives identification of an intent to pay or perform and monitors and tracks such a pledge.

Calendar manager or calendar application 184 may be of the same type as calendar unit 158 of customer device 150. Calendar 184 may be linked or in communication with calendar 158. Calendar application 184 may be any of the types of calendar described above with respect to calendar 158, the type of which may not be influenced by the type of calendar of calendar 158.

The email service provider 170 may be associated with the vendor system 120, the e-commerce system 140, or may be a third party entity. The email service provider 170 may be configured to provide email marketing services. The email service provider 170 may further be configured to provide tracking information showing the status of email sent to each member of an address list. The email service provider 170 may further be configured to segment an address list into different interest groups or categories to send targeted information. The email service provider 170 may also parse messages based on the secondary system of email-targeted tokens. The email service provider 170 may also be configured to send trigger emails based on responses from the vendor system 120 or customer behavior. The email service provider 170 may further be configured to create or use templates generated by the e-commerce system 140. The templates may be used for sending information to contacts. Email service provider 170 may include a customer interface that allows a customer to adjust the template or it may be integrated with external sources (e.g. vendor system 120 or e-commerce system 140). The email service provider 170 may comprise a send engine (not shown), which allows vendors to distribute their message that may be received by one or more customer device(s) 150. The email service provider 170 may further include a tool for generating mailto links, graphic buttons, and tokens. The email service provider 170 may be configured to dynamically customize the content of emails that are sent out, to tailor personalized information and mailto links.

The banking server (not shown) may be controlled by a third party system bank. The e-commerce system 140 may communicate with the banking server to verify that the customer has adequate funds or credit for the requested payment. For example, the banking server may be a controlled by VISA, AMERICAN EXPRESS, MASTERCARD or any other banking or financial network that a customer may use for online payment. The banking server may be an automatic clearing house services (ACS). The banking server may be an interface for a centralized or decentralized virtual currency system or protocol such as frequent flyer miles, "reward" points, or Bitcoin.

Credit card vault 195 may also be included in E-Commerce System 100. Credit card vault 195 may include any credit clearing house. This is shown as being independent from any of the other entities in the system including customer device 150, e-commerce system 140, vendor system 120, payment processing system 160, and banking server (not shown) for example. Credit card vault 195 may be housed, received input or be a combination of the clearinghouse portion of any of the other entities in the system including customer device 150, e-commerce system 140, vendor system 120, payment processing system 160, and banking server (not shown) and is shown as a separate entity only for ease of understanding and clarity.

The email-based e-commerce system 140 may allow vendors to send advertising emails or bills with a mailto link associated with a specific product offer (or payment amount) and select the mailto link and generate a response email by selecting the mailto link. This response email contains a token and is addressed to the e-commerce system 140. Once sent, this response email confirms the customer's payment for the product (or prepayment of a bill) by parsing the information in the token. The e-commerce system 140 processes the payment and notifies the vendor system 120 and the customer device 150. The e-commerce system 140 may comprise a token generator 141 as well as components for processing the tokens and components for processing the payments and a system for notifying the vendor system 120 of the transaction details.

The functionality of the offer, mailto link, and response email is described in U.S. Pat. No. 9,152,980 which issued on Oct. 6, 2015 entitled EMAIL-BASED E-COMMERCE, which is a continuation of U.S. Pat. No. 8,775,623 which issued on Jul. 8, 2014 entitled SYSTEM AND METHOD FOR EMAIL-BASED E-COMMERCE, and U.S. Pat. No. 9,058,591 which issued on Jun. 16, 2015 entitled EMAIL-BASED DONATIONS, which applications are incorporated by reference as if fully set forth.

Referring back to the example system in FIG. 1, the payment processing system 160 may be an independent third party operated unit, it may be located in the e-commerce system 140 or the vendor system 120.

While the example system shown in FIG. 1 shows the e-commerce system 140 comprising the token generator 141, this is shown as an example only. The vendor system 120 may also include a token generator 141 that allows vendors to directly create tokens. In another example, a third party may have a token generator 141 to create tokens for use by the vendor system 120.

System 100 may not require the vendor system 120 to host the token generator 141 on their system. System 100 uses the web browser's ability to transmit a message securely between two frames of a page and validating the URLs of those two pages.

Mailto links in the email messages may include one or any combination of the following fields: a "mailto:" and/or "to" field that indicate one or more email addresses of recipients of the new message; a "Copy To" or "CC" field that indicates one or more email addresses of recipients to whom a copy of the new message should be sent; a "Blind Copy To" or "BCC" field that indicates one or more email addresses of recipients to whom a "blind" copy of the new message should be sent; a field that indicates the subject of the new message; and a field that indicates the body of the new message. The mailto links may be defined according to the format described in Internet Engineering Task Force (IETF) RFC2368, which is incorporated by reference as if fully set forth herein. The mailto link may be accessed with a corresponding short URL.

The e-commerce system 140 may include a database of registered customers, such as for payment processing. The e-commerce system 140 may identify a customer by their email address and may decode tokens included in the content of an email and process payments based on the data in the token. A vendor that is associated with the e-commerce system 140 may send emails with the tokens generated for processing by the e-commerce system 140. When generating tokens, a related URL checkout page with a matching offer is generated. This allows vendors via vendor system 120 to send emails with payment options, including payments for product offers, donations, services and gift cards, for example, with each offer associated with a token and a URL checkout page. The token is associated with a mailto link. A customer may activate the mailto link by selecting (or "clicking on") the link and send the message to the e-commerce system 140. The e-commerce system 140 may then identify the email address and decode the token. If the e-commerce system 140 determines that the email address is not registered in the database, the e-commerce system 140 sends an email back to the customer with a URL link that is a checkout. This checkout is prepopulated based on the customer's mailto link selection based on the content of the token. The URL captures the payment information and registry information. The e-commerce system 140 updates the database once the new customer is registered. In future transactions, the email address of the customer is identified as registered by the e-commerce system 140 and the payment is processed exclusively through an email payment gateway.

An email-based e-commerce system 100, as described herein, allows an email payment opportunity. This may include an email advertisement offering a product or service which is sent to customers and contains one or more mailto links. Each mailto link may relate to an item (e.g. service or product). If the mailto link is selected by a customer, an email message associated with an item or items is generated. Within that generated email message is a token that includes encoded information such as the purchase amount, the merchant, or an item identifier. The information contained in the token includes details for both the completion of email transaction and details that provide context and direction for the process of completing a transaction when the details included within the token are not sufficient. This may include details about the composition of a page to collect more information from the customer (where the required fields and information about those fields are stored directly in the token), a pointer to a location where the composition of a page to collect more information is stored (where the required fields and information about these fields are indirectly referenced by data in this token for retrieval at a later time), or a pointer or description of a routine to execute in case of failures (e.g. a response email in the case of product unavailability). This mailto link may be generated by a vendor through a web interface tool, or by using the e-commerce system 100 to programmatically create either the token or the full mailto link.

For a customer to complete an email transaction, the customer's payment information may be contained in the email e-commerce system database 163. In order to determine if the customer's payment information is in database 163 the token may be decoded to recognize the customer when the email arrives at the e-commerce system 140. The vendor sends the first email via the vendor system 120. The customer via customer device 150 responds by activating a mailto link by sending the response to the e-commerce system 140. If the customer is registered and the incoming email is authenticated, when the token is decoded, the transaction is processed.

If the customer is not registered, a web checkout page may be needed. Additional information may be encoded within the email token that describes a web checkout page for the email offer. The vendor's email may thereby serve multiple purposes. One enables the email to perform as an email payment, if the customer is registered, and another enables the unregistered customer to be sent a web checkout 164. The web checkout 164 may be prepopulated with additional information based on the customers' original selection that is decoded from the token. The additional information included within the token identifies remote resources, which may include an input display and validation components. The remote resource may function as a plugin, as a reference to information stored in a database, or as a hook into the execution of an independent function.

When the web checkout 164 page is being loaded by the customer, the input display may provide the requirements for displaying the field on the form, including field name, entry box length, and other properties of the input field.

When the form has been filled out by the customer and is submitted, these form fields are sent to the validation resource to confirm that the information entered meets the formatting, length, data type, and any other requirements of the field. If validation resource returns a "pass" condition for the form, submission continues to the e-commerce system 140. If the validation resource returns a "fail" condition for any data on the form, error messaging may be displayed to the customer, to enable correction of the one or more particular inputs that were identified as incorrect and resubmission again.

These remote resources may be created to describe standard information that may be used across numerous merchants, or they may be used to define custom information that may be used for a single merchant.

Using this system 100, a vendor via vender system 120 may not be required to expend additional computer programming effort because it relies on the email e-commerce system 140. If the offer web page is linked to the email purchase opportunity, the vendor may not be required to modify any existing systems or processes to register customers with the email e-commerce system 140. The vendor may not need to segment their email lists into registered and unregistered customers and the customers are not aware of the distinction within the content of the email. The distinction between customers occurs by virtue of the system relieving both the vendor and the customer of any excess choices or distinctions. The vendor may create offers manually via a web interface, and the email e-commerce system 140 may handle the aspects of the transaction, from receiving the order request, facilitating the payment processing, storing relevant transaction data, sending a receipt, and displaying transaction data to the vendor.

The vendor may integrate directly with an API. The vendor may maintain existing payment flows separate from their email e-commerce solution, or the vendor may use the email e-commerce system as a full-featured payment system for both web and email transactions without doing any software development. Presenting the customer with a clear process that seamlessly migrates the customer to adopt an email-based checkout process eases the customer into a new technology where transactions happen by email instead of on a URL. This system 100 provides a vendor with a more automated or customized way of handling elements that may be achieved through the use of the email e-commerce system 140.

Figure 2:
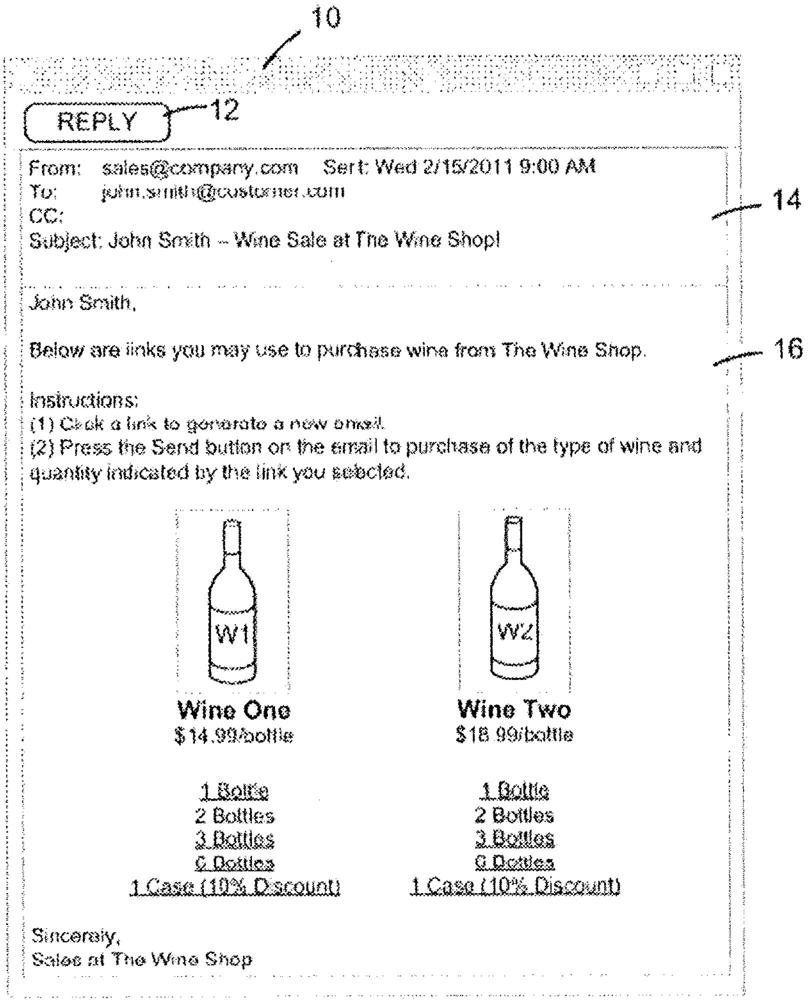
FIG. 2 illustrates an example email message that solicits the purchase of goods from a vendor.

FIG. 2 illustrates an example email message that solicits the purchase of goods from a vendor. FIG. 2 shows an email display window 10 that may be used by the email client module of customer device 150 to display a first example email message from the message processing module. The email display window 10 may include a reply button 12, a control area 14, and a message body area 16. The control area 14 may display control and/or header information associated with the email message, such as the email addresses of the sender and recipient of the message. According to this example, the control area 14 shows that the sender of the message has the email address "sales@company.com." This is an email address that may be associated with an account used by the e-commerce system 140 for the communication of email messages. Further to this example, the control area 14 shows that the email address of the example recipient of the message (John Smith) is "john.smith@customer.com." The control area 14 may also display information such as a subject of the email message and the time the email message was sent. The reply button 12 may respond to user input to generate a new display element (not depicted) to respond to the email message.

The message body area 16 may display the body of the email message. As shown in FIG. 2, the message body area 16 may display an example email message that shows information related to two example products (Wine One and Wine Two) that are being offered for sale by an example vendor (The Wine Shop). The message body area 16 includes a picture of a bottle of each type of wine, as well as the price for a bottle of each type of wine. The message body area 16 also includes, under the picture of the bottle of Wine One, a number of mailto links, such as the "1 Bottle," "2 Bottles," "3 Bottles", "6 Bottles," and "1 Case (10 percent Discount)" links. The message body area 16 also includes similar links under the picture of the bottle of Wine Two. These links may be defined according to the mailto URI scheme or other appropriate format, and each may describe a new email message that may be generated by the email client module of customer device 150 when that link is selected.

The "1 Bottle" link beneath the picture of the Wine One bottle may include information that, if selected, generates an email message that, if received by the e-commerce system 140, will indicate to the e-commerce system 140 that John Smith may like to purchase one bottle of Wine One. As a further example, Wine One may have a product identifier of "0005," and John Smith may have a customer identifier of "0777." According to this example, the "1 Bottle" link may describe an email message that is addressed to an email account that is associated with the e-commerce system 140, and that includes a message body that includes the identifier for John Smith ("0777"), an identifier of the selected product ("0005"), and an identifier of the quantity that John Smith may like to order (in this example, a single bottle). Alternatively or additionally, the email message described by the link may include information such as text that describes the order, an identifier of the vendor (in this example, The Wine Shop), an email campaign identifier, and/or other information. Similarly, the "2 Bottles" link beneath the picture of the Wine One bottle may include information that describes an email message that, if received by the e-commerce system 140, will indicate to the e-commerce system 140 that John Smith may like to purchase two bottles of Wine One. According to this example, the "2 Bottles" link may be defined as follows:

<a href="mailto:sales@company.com?subject=Purchase percent 20from percent 20Wine percent 20Shop percent 20 and body=You percent 20have percent 20created percent 20 an percent 20order percent 20for percent 20two percent 20bottles percent 20 of percent 20Wine percent 200ne. percent 20Press percent 20the percent 20Send percent 20button percent 20 to percent 20complete percent 20the percent 20order. percent OA percent OAProductID0005 percent 20QualifierNA percent 20Qty0002 percent 20CustomerID0777 percent 20CampaignID0003" target="_blank">2 Bottles</a> mailto: sales@company.com?Subject="Press send to pay $42.99 to Wine Shop"? body="TEXT XXX-XXX-XXX-XXX"

In addition, the token identifier may be part of the To: address, or any other portion of an address field, or the address field itself. This token may be, for example, of the form: ex: mailto:payment-id-XXX-XXX-XXX@payments.atpay.com?Subject="Press send to pay $42.99 to Wine Shop"?body="TEXT". Once this token identifier reaches the e-commerce system 140, the e-commerce system 140 may perform a look-up of the actual token in order to parse the offer details. This process is described in greater detail below.

Similarly, the "3 Bottles," "6 Bottles," and "1 Case (10 percent Discount)" links beneath the picture of the Wine One bottle indicate corresponding information for three bottles, six bottles, and one case of bottles, respectively. Additionally, the "1 Bottle," "2 Bottles," "3 Bottles," "6 Bottles," and "1 Case (10 percent Discount)" links under the Wine Two bottle indicate corresponding information for Wine Two as that described above with respect to the mailto links relating to Wine One.

The email client module of customer device 150 may receive a user input that indicates that one of the links displayed in the message body area 16 is selected. The user input may be, for example, a mouse click, keyboard input, or any other type of input that indicates that a link is selected. The email client module of customer device 150 may, in response to this user input, generate and display an order email message as specified by the selected link.

Figure 3:
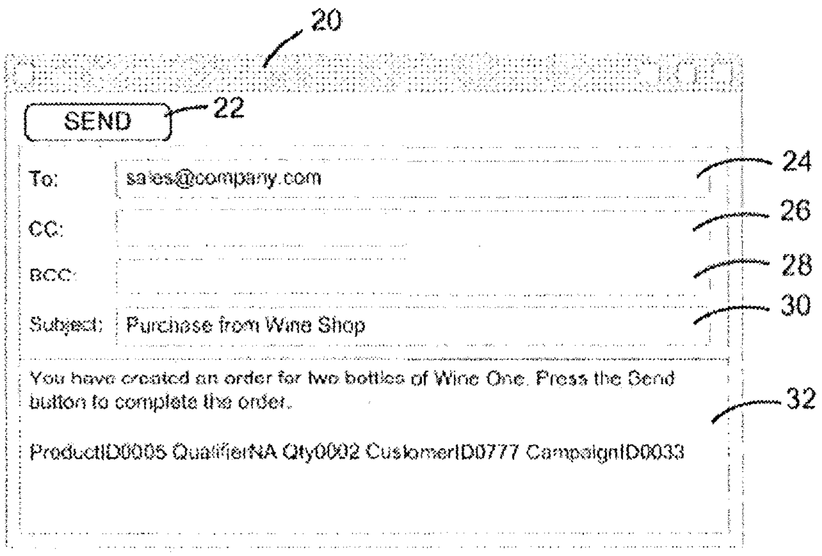
FIG. 3 illustrates an email message for placing an order.

FIG. 3 illustrates an email message for placing an order. FIG. 3 shows an example message composition window 20 that may be displayed in response to a selection of a link from the message body area 16 of the email display window 10 of FIG. 2. The message composition window 20 of FIG. 3 may include a Send button 22, a To area 24, a CC area 26, a BCC area 28, a Subject area 30, and a message body area 32. The Send button 22 in the message composition window 20 of FIG. 3 may be responsive to input from a user such as a mouse click, keyboard input, or any other type of input. The different areas 24, 26, 28, 30, 32 in the message composition window 20 display different portions of an email message. For example, the To area 24 includes text that indicates email addresses to which the email message is addressed, while the message body area 32 displays the contents of the body of the email message. Each or any of these different areas 24, 26, 28, 30, 32 may be editable based on user input. Changes to the contents of these areas 24, 26, 28, 30, 32 may change the corresponding portion of the email message.

FIG. 3 shows an example wherein the "2 Bottles" link beneath the picture of the Wine One and described above with reference to FIG. 2 is selected. The To area 24 indicates that the message is addressed to sales@company.com. The Subject area 30 indicates that the subject of the message is "Purchase from Wine Shop." The CC area 26 and BCC area 28 are blank. Continuing the example of FIG. 3, Wine One product has a product identifier of "0005" and John Smith has a customer identifier of "0777." Accordingly, the message body area 32 includes the text "ProductID0005" and "CustomerID0777." To indicate that the user has selected the purchase of two bottles, the message body area 32 includes the text "Qty0002." Further, the message body area 32 includes the text "CampaignID0033," indicating that the order is associated with an email campaign with an identifier of "0033."

In an instance where a different link from the message body area 16 of FIG. 2 is selected, the display areas 24, 26, 28, 30, 32 in the message composition window 20 may include contents specified by the selected different link. For example, in an instance where a link related to Wine Two is selected, the message body area may not include the text "ProductID0005," but may include text that indicates the corresponding identifier for Wine Two.

Figure 4:
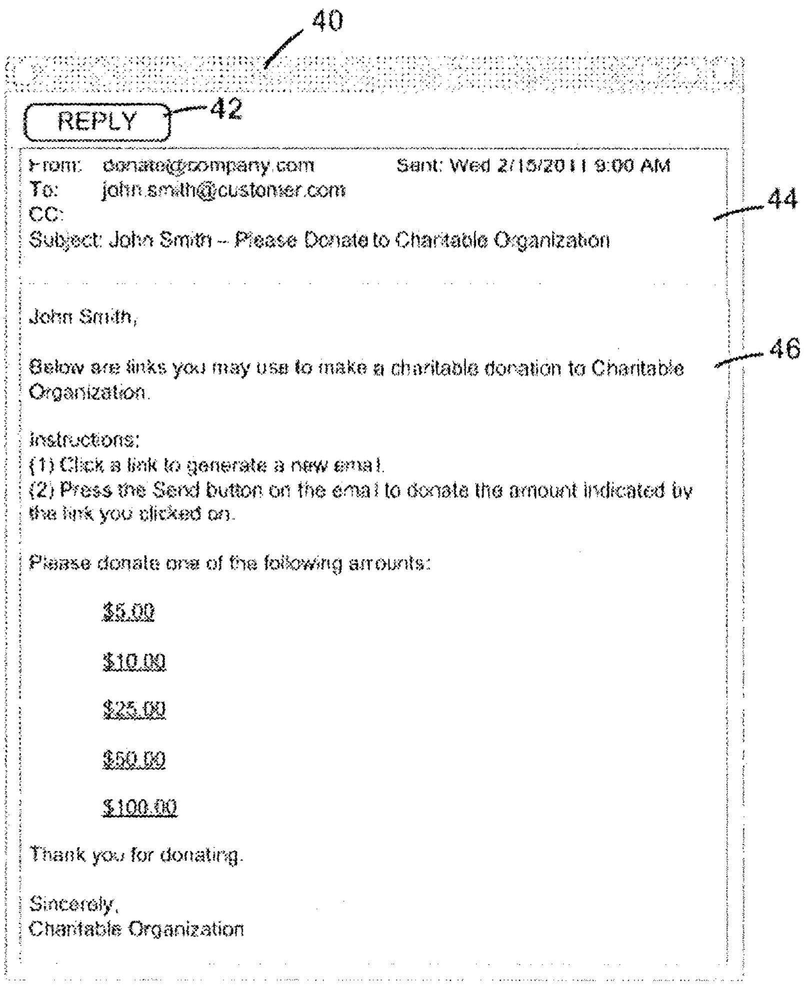
FIG. 4 illustrates an advertisement email message that solicits a donation.

FIG. 4 illustrates an advertisement email message that solicits a donation. FIG. 4 shows an email display window 40 that may be used by the email client module of customer device 150 to display a second example email message from the message processing module. The email display window 40 includes a Reply button 42, a control area 44, and a message body area 46. These display areas 42, 44, 46 may possess similar and/or analogous characteristics and/or perform similar functionality as corresponding display areas 12, 14, 16 in the message composition window 20 of FIG. 2. According to the example of FIG. 4, the control area 44 shows that the sender of the message has the email address "donate@company.com." This is an email address that may be associated with an account used by the e-commerce system 140 for the communication of email messages. Further to this example, the control area 44 shows that the email address of the example recipient of the message (John Smith) is "john.smith@customer.com."

As shown in FIG. 4, the message body area 46 of the email display window 40 may display an example email message that shows information related the solicitation of donations for an example non-profit organization ("Charitable Organization"). The message body area 46 also includes mailto links, such as the "$5.00," "$10.00," "$25.00," "$50.00," and "$100.00" links. These links may possess similar and/or analogous characteristics, and/or include similar and/or analogous information, as the mailto links described above with reference to FIG. 2. The "$5.00" link describes an email message that, if received by the e-commerce system 140, will indicate to the e-commerce system 140 that John Smith may like to donate $5.00 to Charitable Organization. Similarly, the "$10.00," "$25.00," "$50.00, and $100.00" links describe email messages with corresponding information for $10.00, $25.00, $50.00, and $100.00 donations, respectively.

The email client module of customer device 150 may receive a user input that indicates that one of the links displayed in the message body area 46 is selected. The email client module of customer device 150 may, in response to this user input, generate and display an order email message as specified by the selected link.

Figure 5:
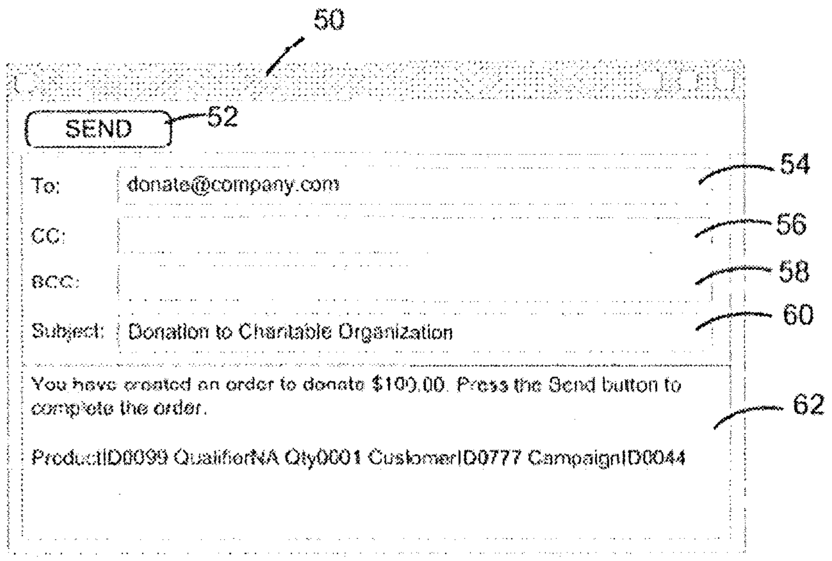
FIG. 5 illustrates an email message for ordering a donation.

FIG. 5 illustrates an email message for ordering a donation. FIG. 5 shows an example message composition window 50 that may be displayed in response to a selection of a link from the message body area 46 of the email display window 40 of FIG. 3. The message composition window 50 of FIG. 5 may include a Send button 52, a To area 54, a CC area 56, a BCC area 58, a Subject area 60, and a message body area 62. These display elements 52, 54, 56, 58, 60, 62 may possess similar and/or analogous characteristics and/or perform similar functionality as corresponding display areas 22, 24, 26, 28, 30, 32 in the message composition window 20 of FIG. 3.

FIG. 5 shows an example wherein the "$100.00" link from the message body area 46 of the email display window 40 of FIG. 4 is selected. The To area 54 indicates that the message is addressed to donate@company.com. The Subject area 60 indicates that the subject of the message is "Donation to Charitable Organization." The CC area 56 and BCC area 58 are blank. According to this example, a donation of $100.00 to Charitable Organization has a product identifier of "0099," and John Smith has a customer identifier of "0777." Accordingly, the message body area 62 includes the text "ProductID0099" and "CustomerID0777." Further, the message body area 62 includes the text "CampaignID0044," indicating that the order is associated with an email campaign with an identifier of "0044."

The email client module of customer device 150 may send the generated order email message to the e-commerce system 140. This may be performed in response to input from a user of the customer device 150. As one example, the email client module of customer device 150 may, in response to a selection of the Send button 52 in the message composition window 50 of FIG. 5, transmit an order email message based on the contents of the fields 54, 56, 58, 60, 62 in the message composition window 50. As another example, the email client module of customer device 150 may, in response to a selection of the Send button 52 in the message composition window 50 of FIG. 5, transmit an order email message based on the contents of the display areas 54, 56, 58, 60, 62 in the message composition window 50.

As initially presented above, a token may be located within the To: Cc: or Bcc fields of a response email. This token may take the form of a short token, for example. The e-commerce system 140 may generate the short token that is located in the To: field, or any other field, for example, as part of the email address. When the vendor system 130 requests that the token generator 141 generate a mailto link with the identifiers and token, the token generator 141 may generate a "short lookup token" and the "long token" encoded with the identifiers. The short lookup token may be associated with the long token and may be required or otherwise needed to access the information in the long token index. The short token index may be sent in an email to the customer device 150 as a mailto link. The customer using the customer device 150 selects the mailto link and generates the response email addressed to the e-commerce system 140. The short lookup token may be built into the address of the response email. The short lookup token may be of the form:

payment-id-74E4DE00-51E2-457B-8C0B-648640EF232D@payments.atpay.com, for example.

When the customer using customer device 150 sends the email and the e-commerce system 140 receives the email and authenticates the customer's email address, the e-commerce system 140 may also determine using the short lookup token included in email address of the e-commerce system 140 the long token associated therewith. When the long token is determined, the e-commerce system 140 decodes the long token and processes the payment. The use of the short token allows for a less convoluted field in the email address and eliminates the need for the token to be located in the body field.

The short token lookup is not necessarily required in this system, as the transactions may be processed with the long token either in the address field, another field, or in the body of the response email. The use of the short lookup token may lessen the one-to-one correlation between the token and the actual offer and/or transaction details, as that correlation may be more direct in the long token embodiment.

It should be understood that many variations are possible based on the disclosure herein. Although features and elements are described above in particular combinations, each feature or element may be used alone without the other features and elements or in various combinations with or without other features and elements.

The methods or flow charts provided herein may be implemented in a computer program, software, or firmware incorporated in a non-transitory computer-readable storage medium for execution by a general purpose computer or a processor. Examples of non-transitory computer-readable storage mediums include a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs).

A system is described that uses the e-commerce system 140 to process emails for making payments. As shown in FIG. 1, a single payment processing system is described. The present invention's flexibility and control offers vendors a choice of which payment processor to use. Additionally, a payment processor may be a vendor and offer payments by email. Payment processors and payment gateways may integrate the e-commerce system 140 and restrict access to other payment processors and gateways.

Disclosed herein is a system and method for facilitating payments through email, SMS, and social media messaging that is delivered by cable television experience and leverages an environment where internet and cable television converge to a greater or lesser extent. E-commerce system 140 generates tokens embedded in mailto links where the email addresses are authenticated and tokens are decoded. These mailto links may be presented to the customer through various methods via cable television system. The customer replies with the required token from a valid address and e-commerce system 140 authenticates the address and decodes the tokens.

Figure 6:
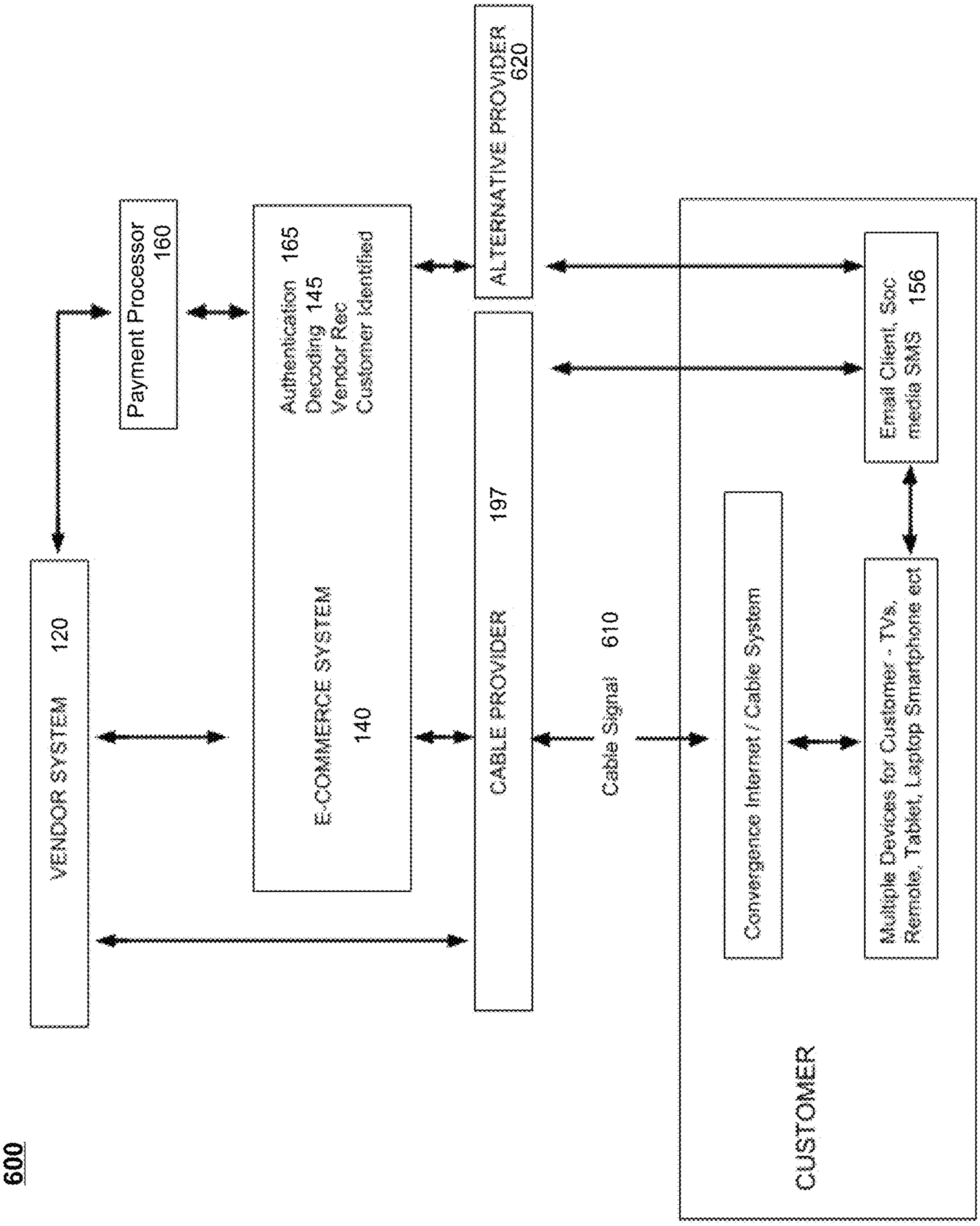
FIG. 6 is a diagram that illustrates the relationships between vendor system, cable provider and e-commerce system.

FIG. 6 is a diagram 600 that illustrates the relationships between vendor system 120, cable provider 197 and e-commerce system 140. Vendor system 120 may be coupled to cable provider 197, e-commerce system 140 directly and via payment processor 160. E-commerce system 140 may be coupled to cable provider 197 and alternative provider 620. A customer may be coupled to cable provider 197 with a cable signal or to alternative provider 620.

E-commerce system 140 ties together vendor system 120 and cable provider 197 for the purpose of making payments. Cable provider 197 facilitates the connection and messaging with the customer in an environment that enables an interactive experience. Cable provider 197 may provide various forms of connection and signals, a customer may access e-commerce system 140 via a cable signal 610 and/or an internet connection provided by cable provider 197. Communication or partial communication may be facilitated by an alternative provider 620, for example another carrier supplying a separate internet connection or a satellite signal. E-commerce system 140 provides email addresses and tokens associated with offers, and authenticates emails and decodes tokens. When authenticated and decoded, e-commerce system 140 requests that payment processor 160 charge the account of the customer.

Figure 7:
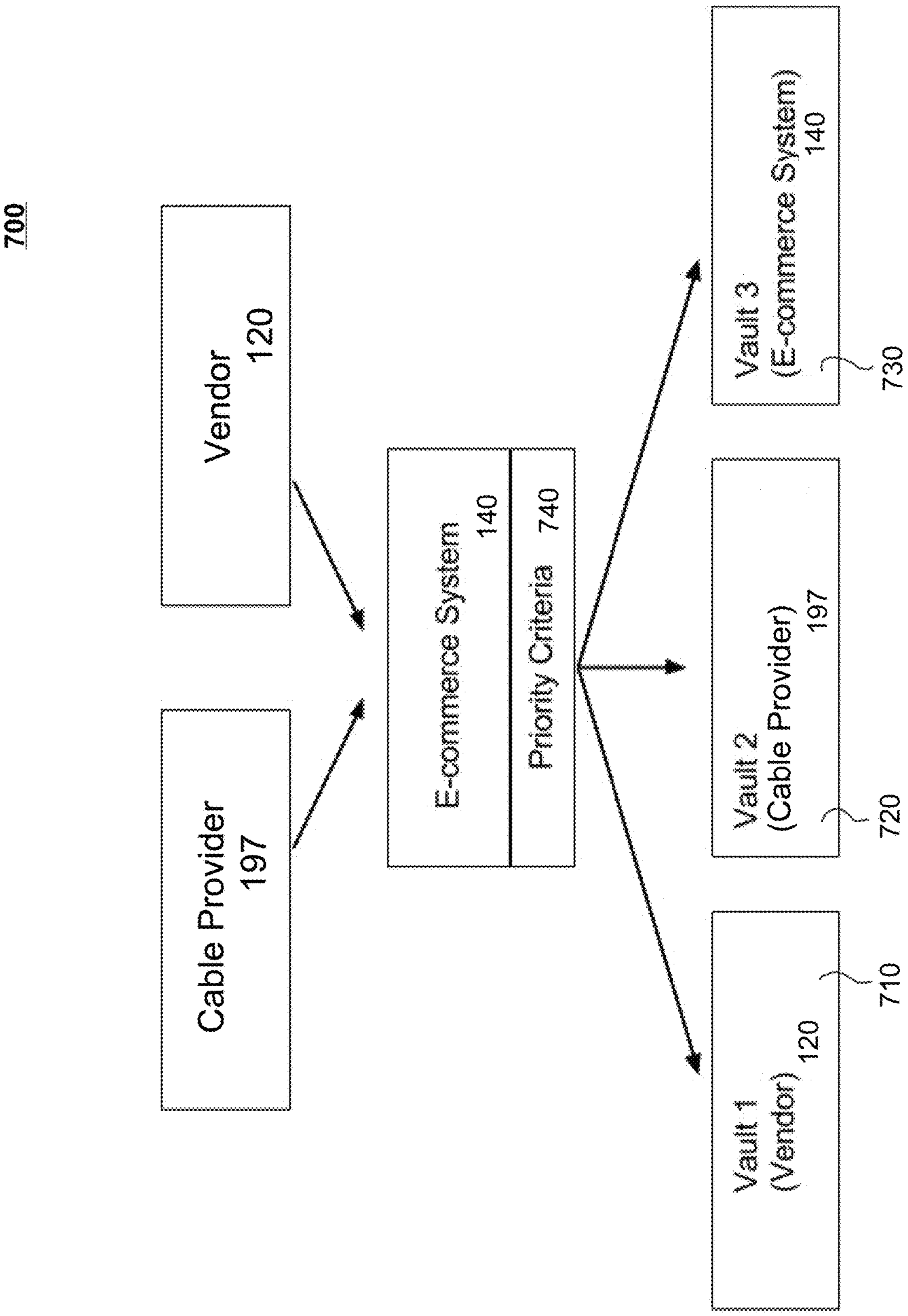
FIG. 7 is a diagram that illustrates the relationship between e-commerce system, vendor, and cable provider including various uses of vaulted information.

FIG. 7 is a diagram 700 that illustrates the relationship between e-commerce system 140, vendor 120, and cable provider 197 including various issues for vaulted information. The relationship of cable provider 197 may include resources such as customer information credit card, banking information, and product information, for example. Access to this information is required to make offers and to charge a credit card or bank account. Using the email address, phone number or social media account, or another identifier, e-commerce system 140 may access these resources such as credit card vaults, sharing information when required or accessing or restricting access based on the needs of the customer, vendor 1290, or cable provider 197. In this example, there are depicted three vaults 710, 720, 730. While three vaults 710, 720, 730 are presented, any number of vaults may be used. E-commerce system 140 sets a priority 740 for each vault 710, 720, 730. Priority 740 may be the order in which each vault 710, 720, 730 is accessed or may be based on the most recent information to be updated. The first vault 710 may be identified for vendor 120. The second vault 720 may be identified for cable provider 197. The third vault 730 may be identified for e-commerce system 140.

Figure 8A:
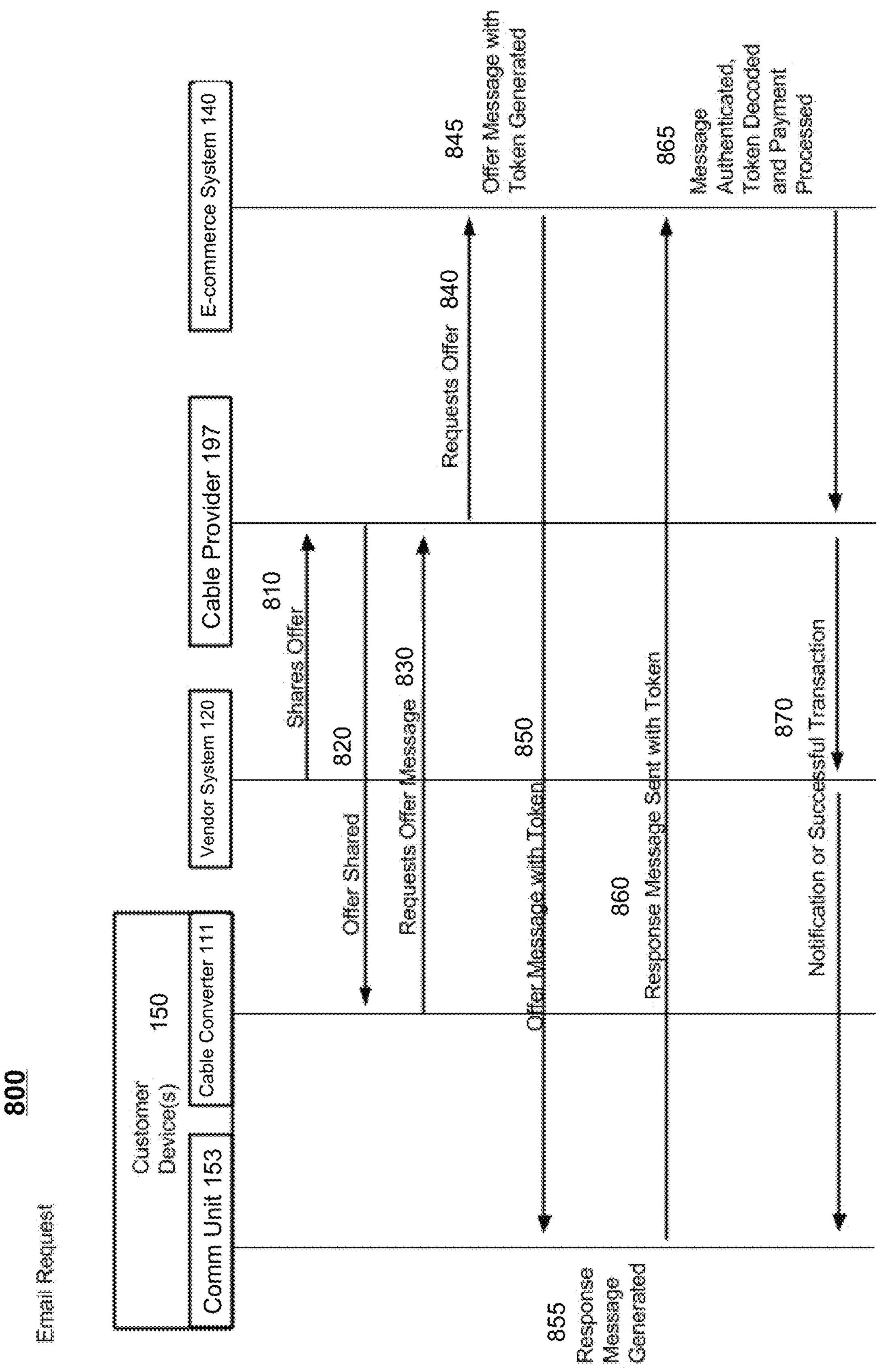
FIG. 8A is a transactional flow diagram that illustrates a method of messaging based payments with interactive cable television by requesting an offer message.

FIG. 8A is a transactional flow diagram 800 that illustrates a method of messaging based payments with interactive cable television by requesting an offer message. Vendor 120 requests from cable provider 197 a promotion of an offer for a product, service, or donation at step 810. Cable provider 197 generates the promotional offer. Cable provider 197 shares the information with customer device 150 at step 820. Sharing the offer may include airing it, or otherwise providing access by a viewer. This may include a situation where the customer via customer device 150 requests access for more information or other actions. Customer using customer device 150 accesses this promotion offer using the converter box and views it on a display unit such as a television screen, projection or other screening device. The access to the converter box may also be supplemented by another device such as a remote control, keyboard, video game console, laptop, tablet, and the like. The customer via customer device 150 selects the option to receive an offer message. This may require placing an email address or selecting a request option. More than one email address may be entered to allow for multiple offers to multiple customers. The customer, via the cable converter 111, shares this request and customer email address with the cable provider system 197. The cable provider system 197 shares request and customer email address with e-commerce system 140 at step 840. E-commerce system 140 recognizes the email address of the customer and identifies the request based on the message from the cable provider 197 at step 830. Although this message is coming from the cable provider 197 in the present example, the message may also come from the vendor 120 or some combination of both. E-commerce system 140 generates an offer message with a token and embeds the token in a mailto link at step 845. The mailto link is included in an offer email message addressed to the to the email address the customer provided. E-commerce system 140 shares the message with the mailto link and token with the communication unit 153 on customer device 150 at step 850. The customer, using the customer device 150, views the email message and selects the mailto link. The mailto link triggers the generation of an email message at step 855 addressed to e-commerce system 140 with the token in the email. The token may be anywhere in the email. The customer via communication unit 153 sends the response email at step 860 and shares the message with e-commerce system 140. E-commerce system 140 authenticates the email message and decodes the token at step 865. If requirements of authentication are not met or the customer is not yet registered with e-commerce system 140, the customer may be sent a confirmation message or a URL link that directs to a web page such as a signup URL and/or URL checkout. If requirements are met, then e-commerce system 140 shares a request for payment with the payment processor. If requirements are met, the payments are processed, updates and notifications are provided at step 870. As an alternative, the offer message may require a process described in FIG. 10 below where the offer has a short URL Link that requests the tokens required for payment processing.

Figure 8B:
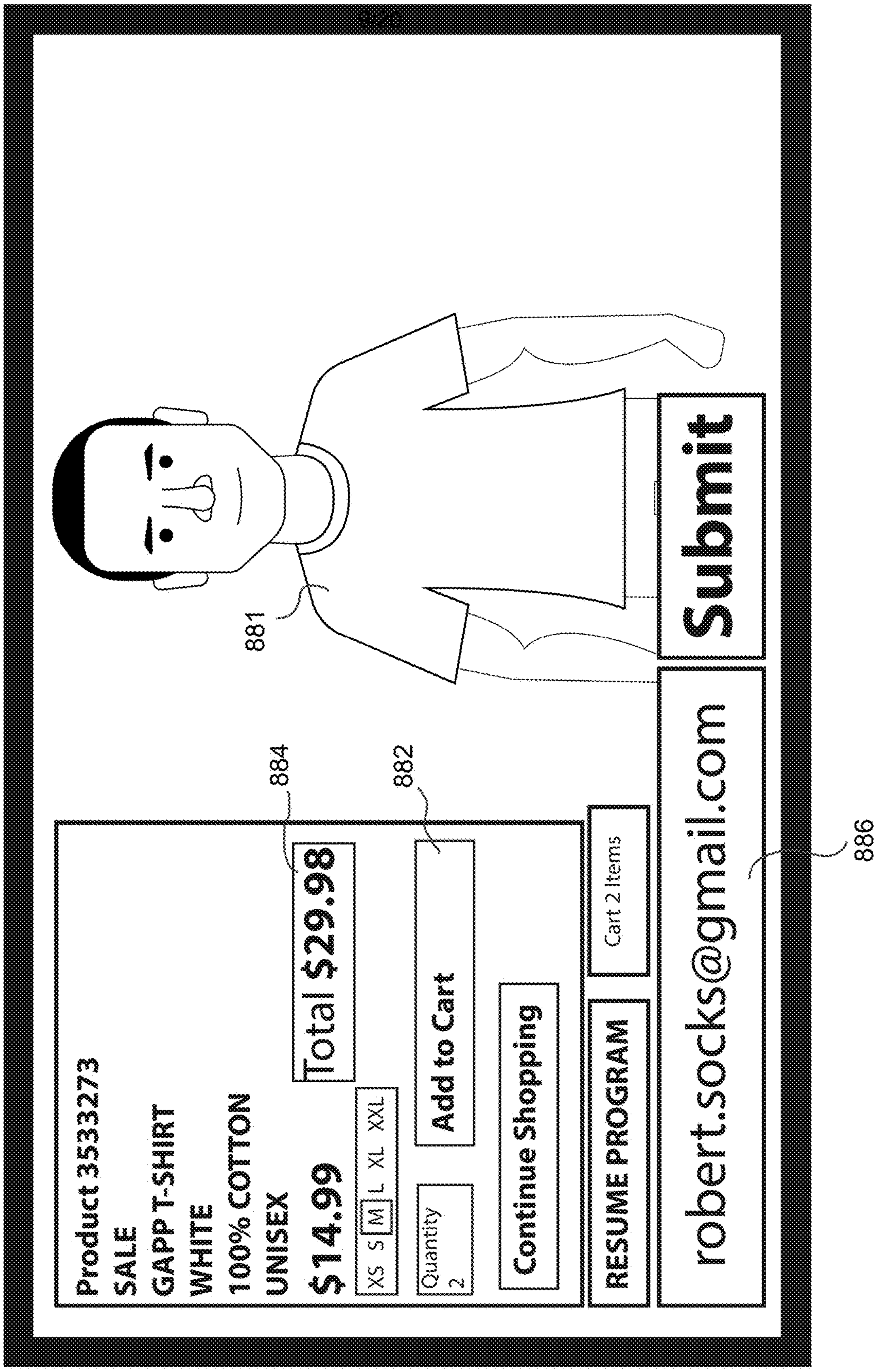
FIG. 8B is an example of one possible interface provided on a television where customers may input details of their purchase.

FIG. 8B is an example 880 of one possible interface provided on a television where customers may input details of their purchase. This may be a display of the merchandise 881 and may suspend the program the customer is watching to input details. Alternatively, this interface may be integrated into the video program. The customer adds items to a cart 882 and the interface displays a total 884. The offer may not require a shopping cart and may be a single option such as 'Donate $10'. The customer enters an identifier such as a phone number, social media handle or in this example an email address 886. Entering this information and activating submit may be immediately followed by a message to check messages for the offer. This may not be promoted as an offer with payment options, it may be a request for information and the payment option is included as an extra option. A payment offer message may be triggered by other customer behavior such as searches and requests that are monitored. In this example, the offer message is an email, but it may be various other forms of messaging such as SMS or social media.

Figure 8C:
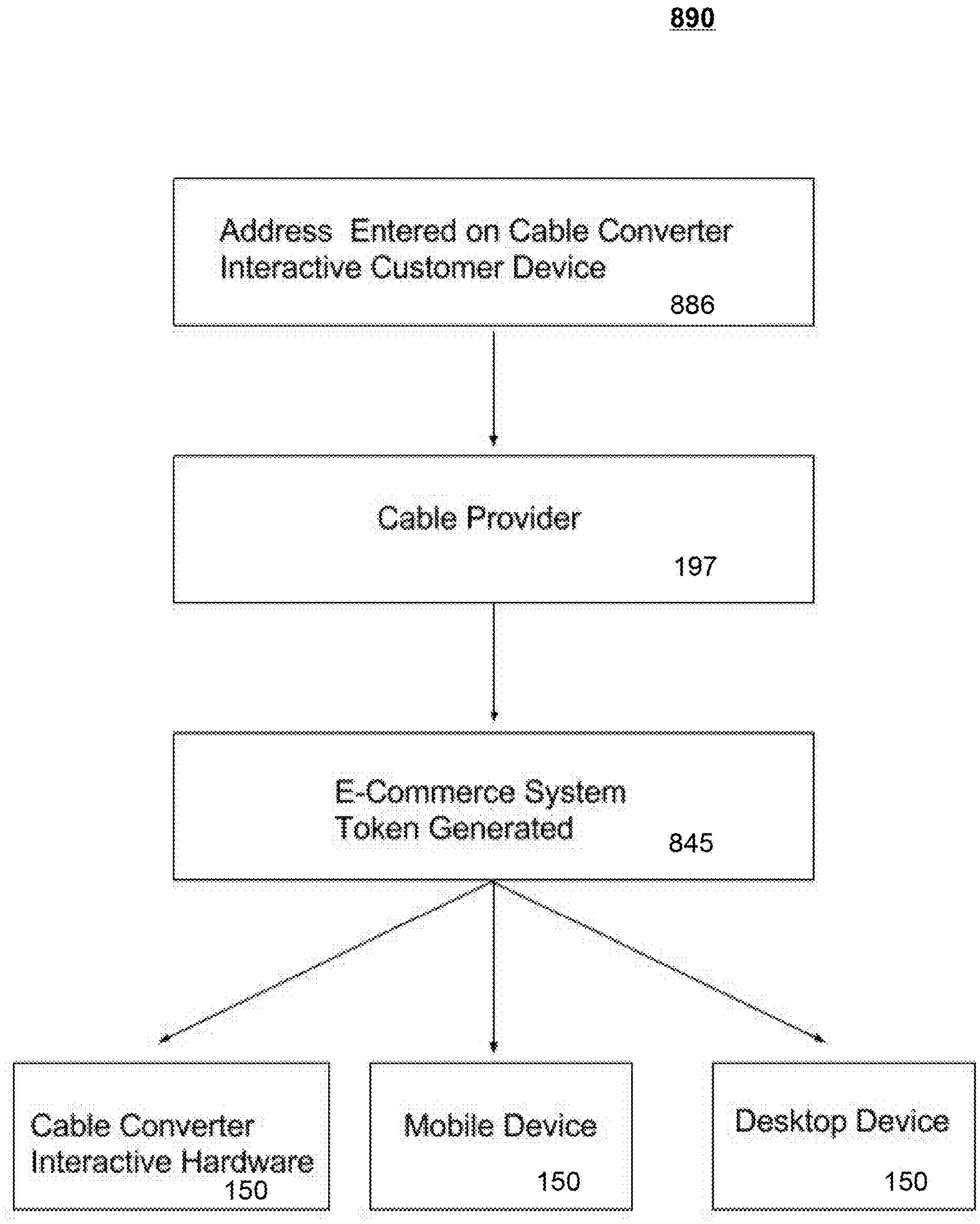
FIG. 8C is a diagram illustrating the interaction where the cable provider shares the request for an offer message and e-commerce system shares that offer message to multiple devices.

FIG. 8C is a diagram 890 illustrating the interaction where the cable provider 197 shares the request for an offer message and e-commerce system 140 shares that offer message to multiple devices. Making payments in interactive television is often linked to the account held at the cable provider, despite the fact that a single television screen may have multiple viewers on each screen there is not an easy way distinguish each viewer for the purpose of making a payment. FIG. 8 A-B disclose a design where the viewers watching the television may interact and make payments based on inputting an identifier such as an email address, phone number or social media handle. This input allows customers to place merchandise in a shopping cart and generate a total or request to make a donation without necessitating a login into an account with the cable provider. Referring back to FIG. 8C, the identifier entered by the customer 886 is shared by cable provider 197 with ecommerce system 140. E-commerce system 140 may then share it with the customer on multiple devices 150. In this example, the customer device 150 may include any device where the communication unit may be accessed. A communication unit 153 may be an email client but may also be a messaging unit that merges various formats of messaging such as SMS, email and social media among other formats. Unlike existing methods that may require the customer to logon to a password protected URL, the disclosed invention allows the customer to directly reply to the offer message to complete the payment.

Figure 9:
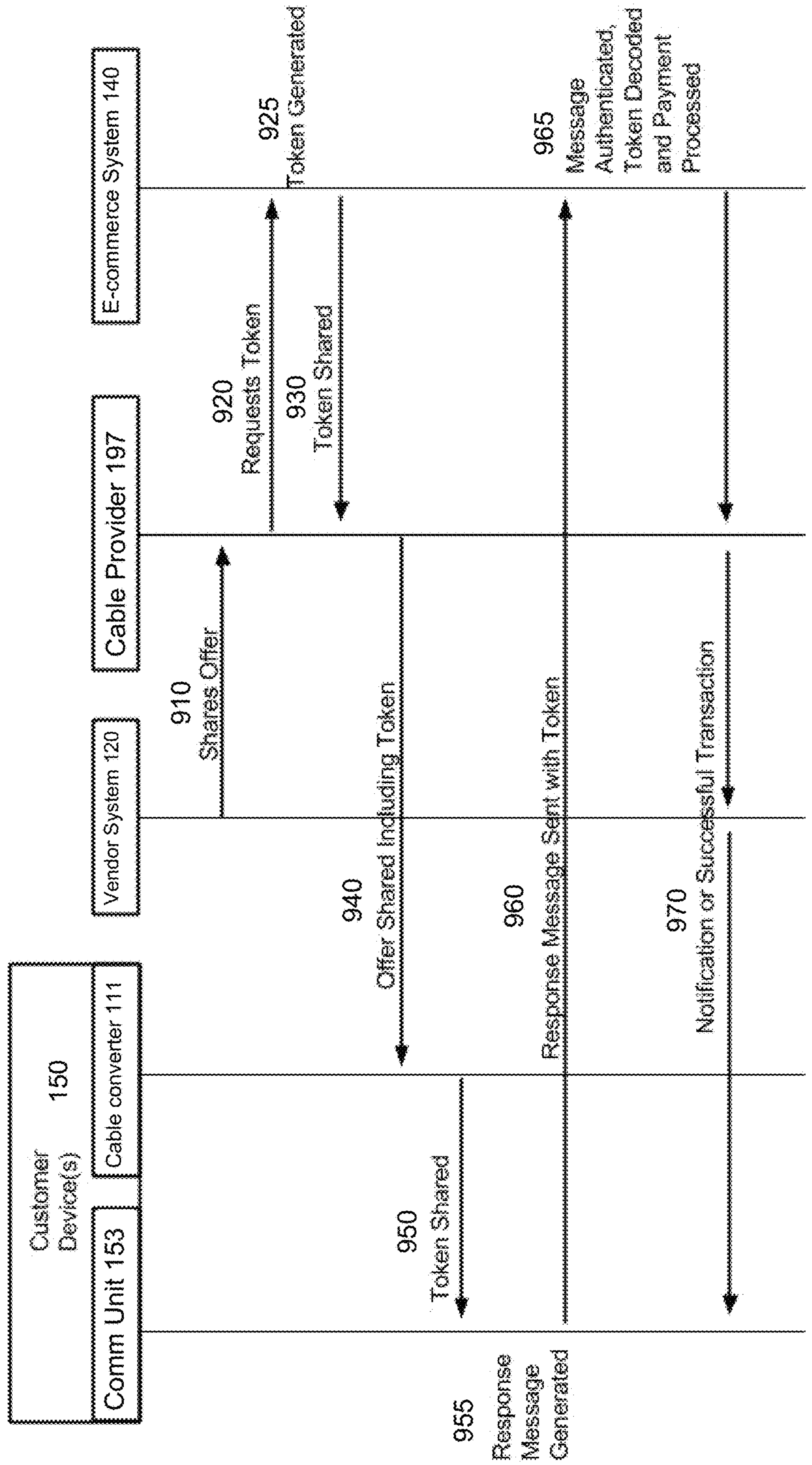
FIG. 9 is a transactional flow diagram that illustrates a method of messaging based payments with interactive cable television by an offer message presented by cable provider that facilitates a customer payment response message.

FIG. 9 is a transactional flow diagram 900 that illustrates a method of messaging based payments with interactive cable television by an offer message presented by cable provider 197 that facilitates a customer payment response message. Vendor 120 requests from cable provider 197 a promotion of an offer for a product, service, or donation at step 910. Cable provider 197 requests from e-commerce system 140 a token at step 920. Although this message is depicted coming from cable provider 197, it may also come from vendor 120.

Based on information provided by the cable provider 197 and/or vendor 120, e-commerce system 140 generates the token 925. E-commerce system 140 generates an offer with a token and embeds the token in a mailto link. The mailto link and token may also be associated with a shortened URL (FIG. 10 below) or some corresponding trigger in cable provider system 197 that is used in place of the mailto link and token. The mailto link and token may be embedded behind an image. E-commerce system 140 shares the message at step 930, with the mailto link and token, with cable provider 197. Cable provider 197 generates the promotional offer, which is aired and may be accessed by the customer at step 940. This may be a request where the customer may access more info or other actions, such as payment messaging.

The customer, using customer device 150, accesses this promotion offer using cable converter 111. The access to the cable converter may also be added by another device, including, but not limited to a remote control, keyboard, video game console, laptop, or tablet. Cable provider 197 shares the information with the customer at cable converter 111. The customer views the offer on the television screen. There may be more than one offer. The customer selects an offer. The selection of the mailto link triggers the opening of communication unit 153 at step 950 and generates a response email at step 955. The token may be shared in step 950 from the cable converter wirelessly because of proximity with the display and/or internally because there is a single customer device 150 functioning as cable converter 111 and communication unit 153. The response email may appear on the television screen or on another device connected to the television and cable converter 111 or router. This may require entering an email address or only clicking a request. The email message is addressed and sent to e-commerce system 140 with the token in the email at step 960. The token may be anywhere in the email. The customer using communication unit 153 sends the email and shares the message with the e-commerce system 140. The process of selecting the offer and sending the email may be one process and not visible to the customer.

E-commerce system 140 authenticates the email message and decodes the token at step 965. If requirements of authentication are not met, the customer may be sent a confirmation message or be sent a URL link that navigates them to a web page such as a signup URL and/or URL checkout. If requirements are met, then e-commerce system 140 shares a request for payment with the payment processor. If requirements are met, the payments are processed, updates and notifications are provided at step 970. As an alternative, the offer message may require a process described in FIG. 10 below where the offer has a short URL Link that requests the tokens required for payment processing.

Figure 10:
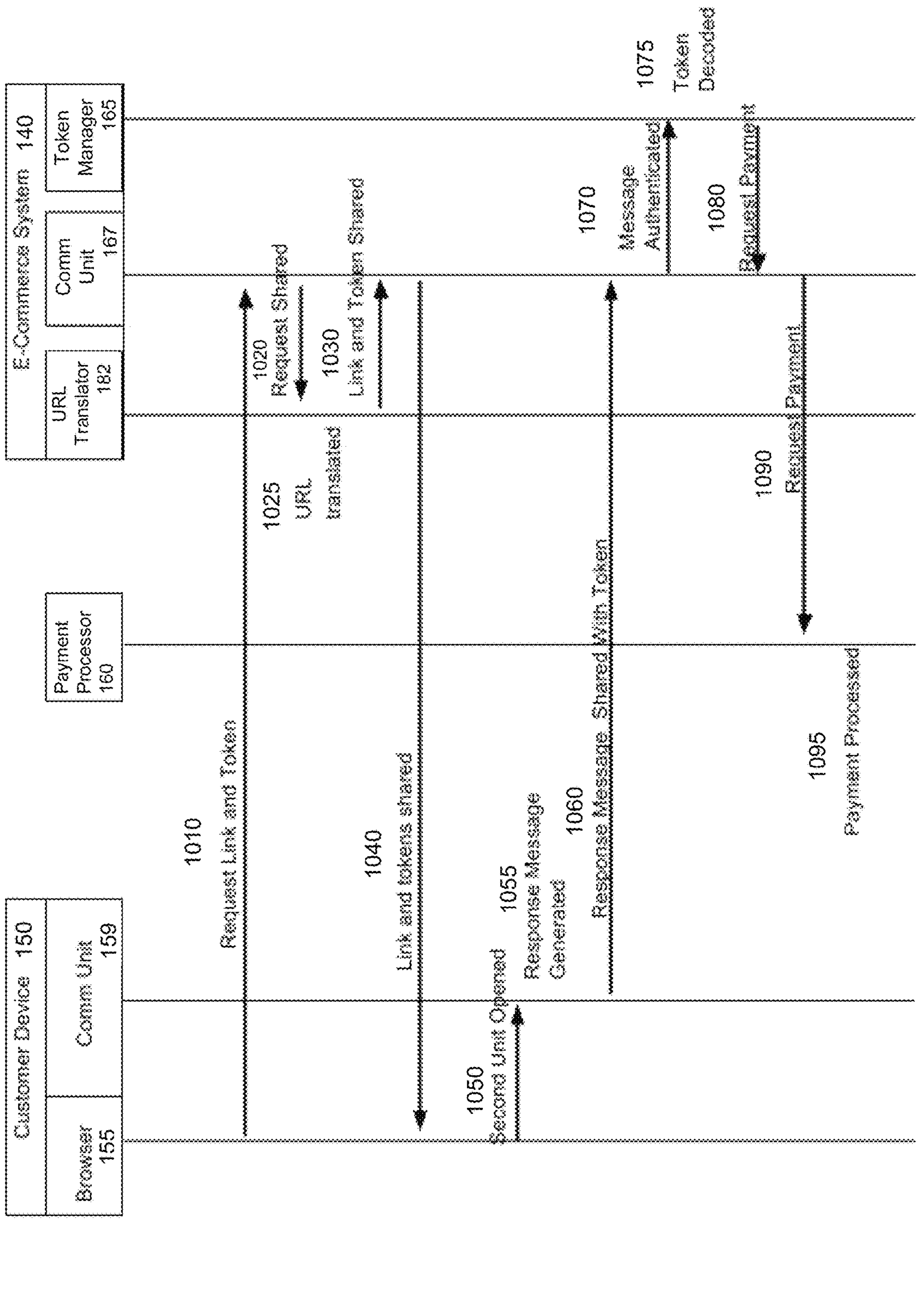
FIG. 10 is a transactional flow diagram illustrating the use of a short URL with token authentication in e-commerce system.

FIG. 10 is a transactional flow diagram 1000 illustrating the use of a short URL with token authentication in e-commerce system 100. In the depicted embodiment, a web browser 155 is utilized by the customer to request a link at step 1010 that triggers a message to confirm payment. Various prompts might trigger the web browser 155 to request the link from the e-commerce system 140. For example the customer may select a URL link in another application that opens the web browser 155 or alternatively the customer may be in a web-based checkout where the customer selects the link that then opens the web browser 155. Opening the web browser 155 triggers a request from communication unit 167 for a mailto link and token at step 1010. The request may be a series of requests or require the e-commerce system 140 to tally an amount due of the customer. E-commerce system 140 may also require a lookup of other required information. The communication unit 167 shares the request with the URL translator 182 at step 1020. The URL translator 182 translates the URL link at step 1025 and shares the corresponding link and token with the communication unit 167 at step 1030. This token may be a short token that corresponds to a longer token. The communication unit 167 shares the link and token with the browser 155 at step 1040, triggering the messaging unit 159 at step 1050 to generate the response message with the token at step 1055. The opening of the browser 155 may not be visible to the customer on customer device 150. The response message is addressed and sent to the e-commerce system 140 communication unit 167 with the token at step 1060. The token may be located anywhere in any field of the message. The communication unit 167 authenticates the message at step 1070 and shares the token with the token manager 165 to decode the token at step 1075. If the token is a short token, it may need to be matched with a corresponding long token. The long token may require additional decoding (not shown). If either the authentication or the token decoding does not meet requirements, the customer via customer device 150 may receive a response message requesting an additional confirmation or a URL link that navigates the customer device 150 to a signup URL and/or checkout. If all requirements are met, the token manager 165 notifies the communication unit 167 that requirements are met at step 1080. The communication unit 167 requests payment at step 1090 with the payment processor 160. The payment is processed at step 1095, and updates and notifications are sent.

Figure 11A:
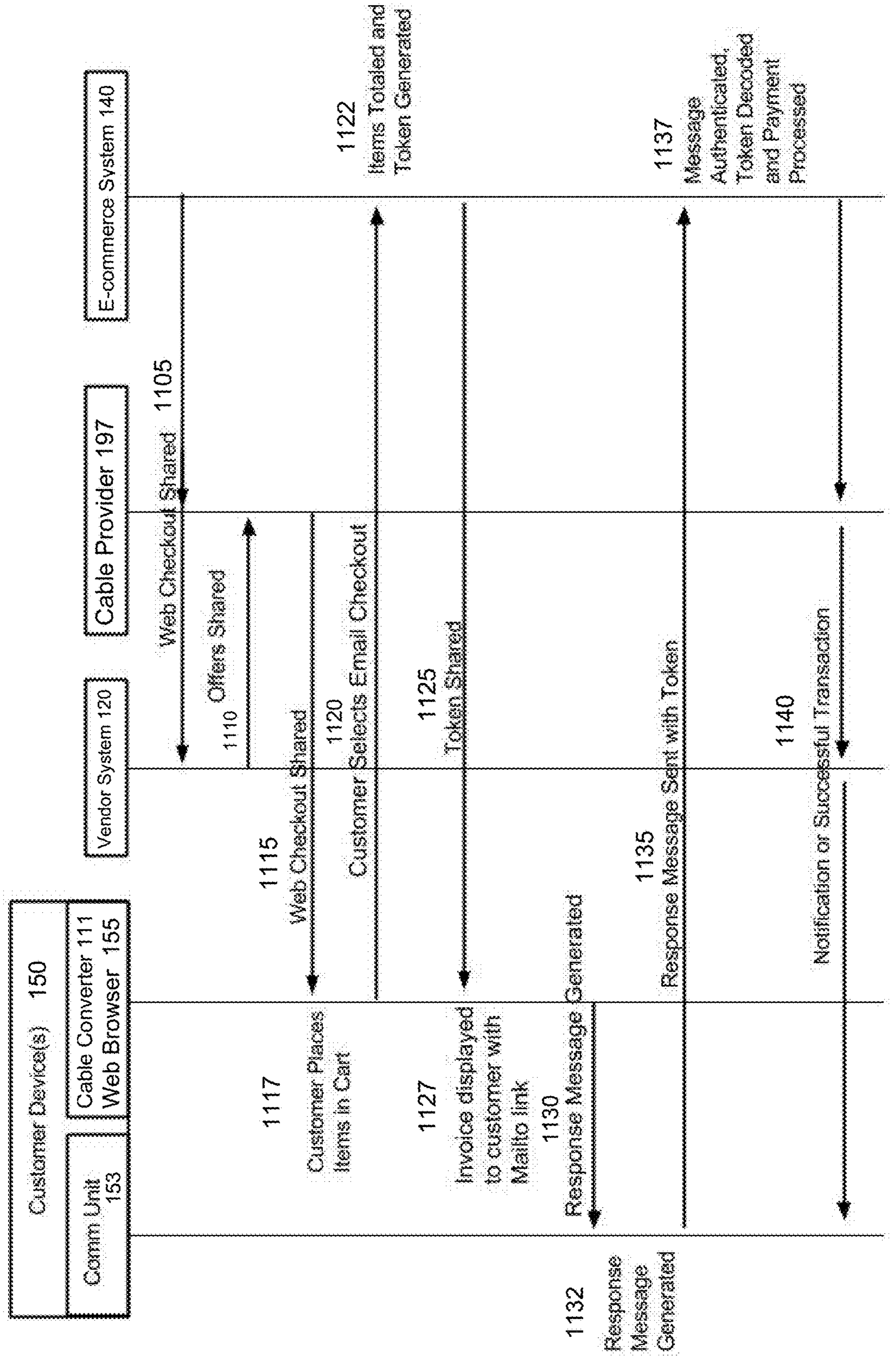
FIG. 11A is a transactional flow diagram of a system and method where the response message is generated directly from a message-based checkout that is integrated with the television, viewing video game, DVR and streaming video service.

FIG. 11A is a transactional flow diagram 1100 of a system and method where the response message is generated directly from an message-based checkout that is integrated with the television, viewing video game, DVR and streaming video service. A viewer watching television may place products in a shopping cart, schedule payments (such as bills), or list donations. These payments are totaled and may be viewed in a window displaying a checkout.

E-commerce system's 140 email-based web checkout is shared with the cable provider 197 and vendor 120 at step 1105. This checkout allows customers to place products, donations, and invoices into a shopping cart and pay for them in a single checkout by sending a message to e-commerce system 140 for authentication and decoding. Vendor shares offers with cable provider 197 at step 1110. Cable provider 197 shares the email based web checkout with the customer via the cable converter 111 and is displayed on the display unit at step 1115.

The customer makes selections and places the items in a shopping cart at step 1117. This may be any form of payment for example merchandise, services, donations or bill payment. These may be accessed through a television broadcast, video stream and/or a web browser working in tandem with the display unit. The access to the converter box or the web may also be supplemented by another interface such as a remote control, keyboard, video game console, laptop, tablet, and the like.

The customer selects the option for email-based checkout and shares the request with e-commerce system 140 at step 1120. Alternatively, this request may pass through cable provider 197 for additional authentication or decoding. E-commerce system 140 totals the items in the shopping cart and generates an associated token at step 1122. E-commerce system 140 shares the token and total with the cable converter 111 and/or browser 155 at step 1125. The token may be in a mailto link or a shortened URL link that may retrieve a mailto link (FIG. 10) or a cable provider 197 equivalent form.

An invoice may be displayed to the customer with a mailto link at step 1127. Activation of the mailto link generates a response message at step 1130. The customer selects the link triggering the communication unit 153 to open and generates the response email at step 1132. The response email has the token and is addressed to e-commerce system 140. The token may be in any field of the email.

The email message is addressed and sent to e-commerce system 140 with the token in the email at step 1135. The token may be anywhere in the email. The customer using communication unit 153 sends the email and shares the message with the e-commerce system 140. The process of selecting the offer and sending the email may be one process and not visible to the customer.

E-commerce system 140 authenticates the email message and decodes the token at step 1137. If requirements of authentication are not met, the customer may be sent a confirmation message or be sent a URL link that navigates them to a web page such as a signup URL and/or URL checkout. If requirements are met, then e-commerce system 140 shares a request for payment with the payment processor. If requirements are met, the payments are processed, updates and notifications are provided at step 1140. As an alternative, the offer message may require a process described in FIG. 10 where the offer has a short URL Link that requests the tokens required for payment processing.

Figure 11B:
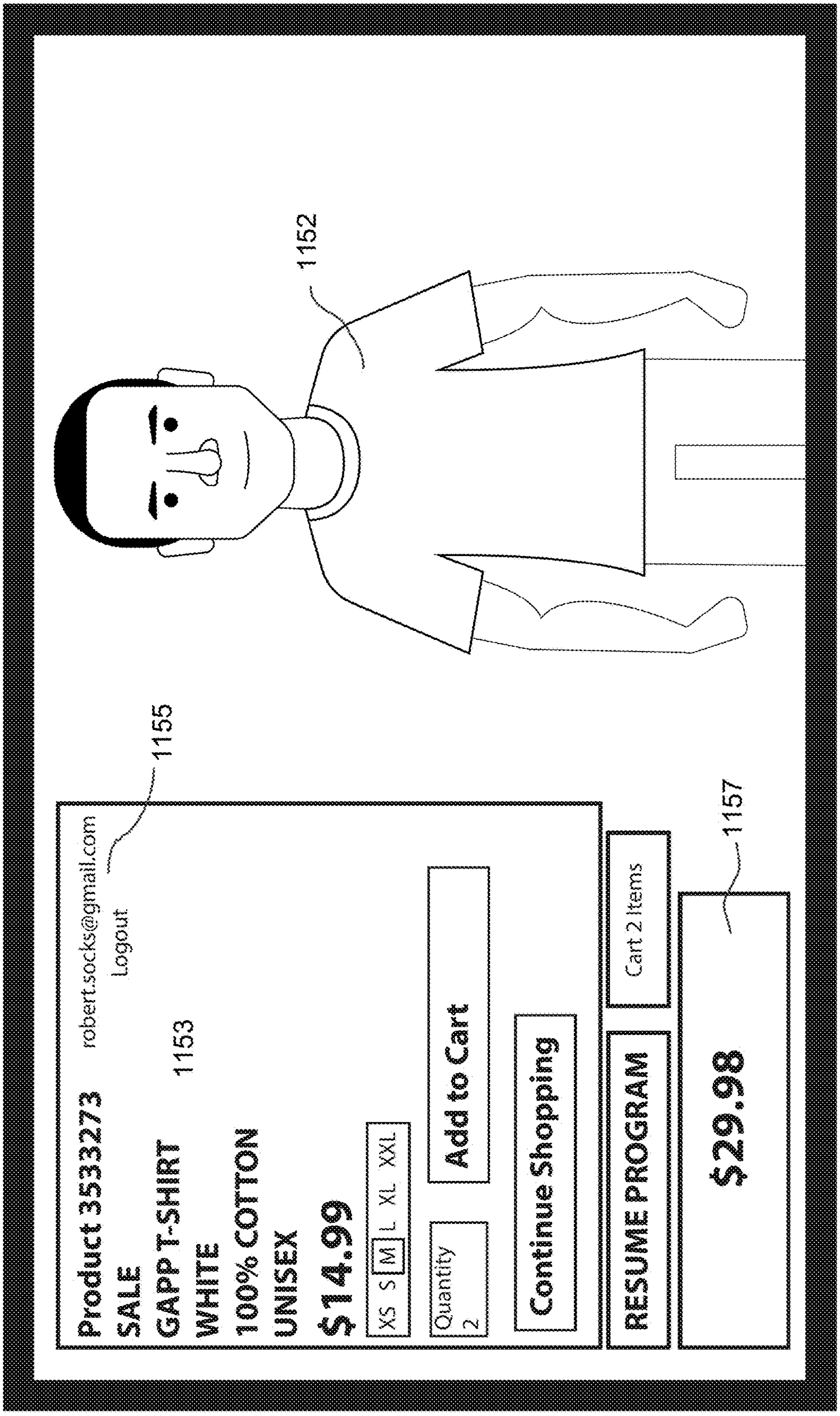
FIG. 11B is an example of a depicted interface using the interactive television with an email-based checkout of FIG. 11A.

FIG. 11B is an example of a depicted interface 1150 using the interactive television with an email-based checkout of FIG. 11A. In this example the television displays a shirt for sale 1152. The customer may access the information about the product 1153 which is displayed with the interface. The email address that is associated to the account is displayed 1155. There may be more than one email or communication unit may be accessed but in this example it is only one address displayed as 'robert.socks@gmail.com'. The total is displayed '29.98' 1157 as a button which has the mailto link embedded behind it (or equivalent short URL link). This total may also be viewed on an addition adjacent or mirrored device that is linked to cable provider 197. The total charge or contents of the shopping cart might be visible on another device associated with the television or cable converter.

Figure 11C:
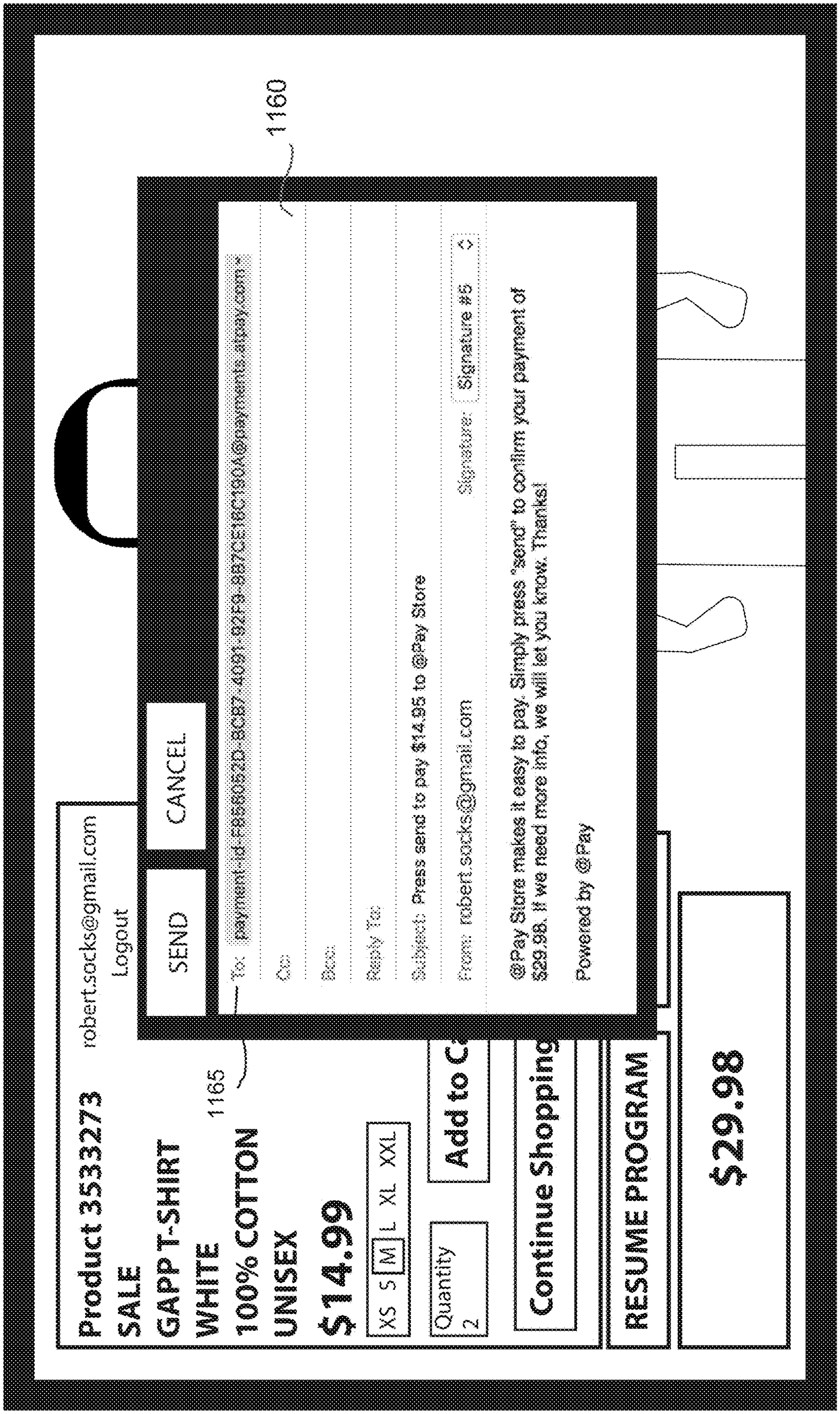
FIG. 11C is an example of the response email being displayed in an interactive interface.

FIG. 11C is an example of the response email 1160 being displayed in an interactive interface. In example FIG. 7C, the token 1165 is in the send field. Although in this example the email is displayed on the television screen, the message may appear on a device linked to the cable system such as a phone or tablet. The customer using communication unit 153 sends the email and shares the token with e-commerce system 140.

Figure 12A:
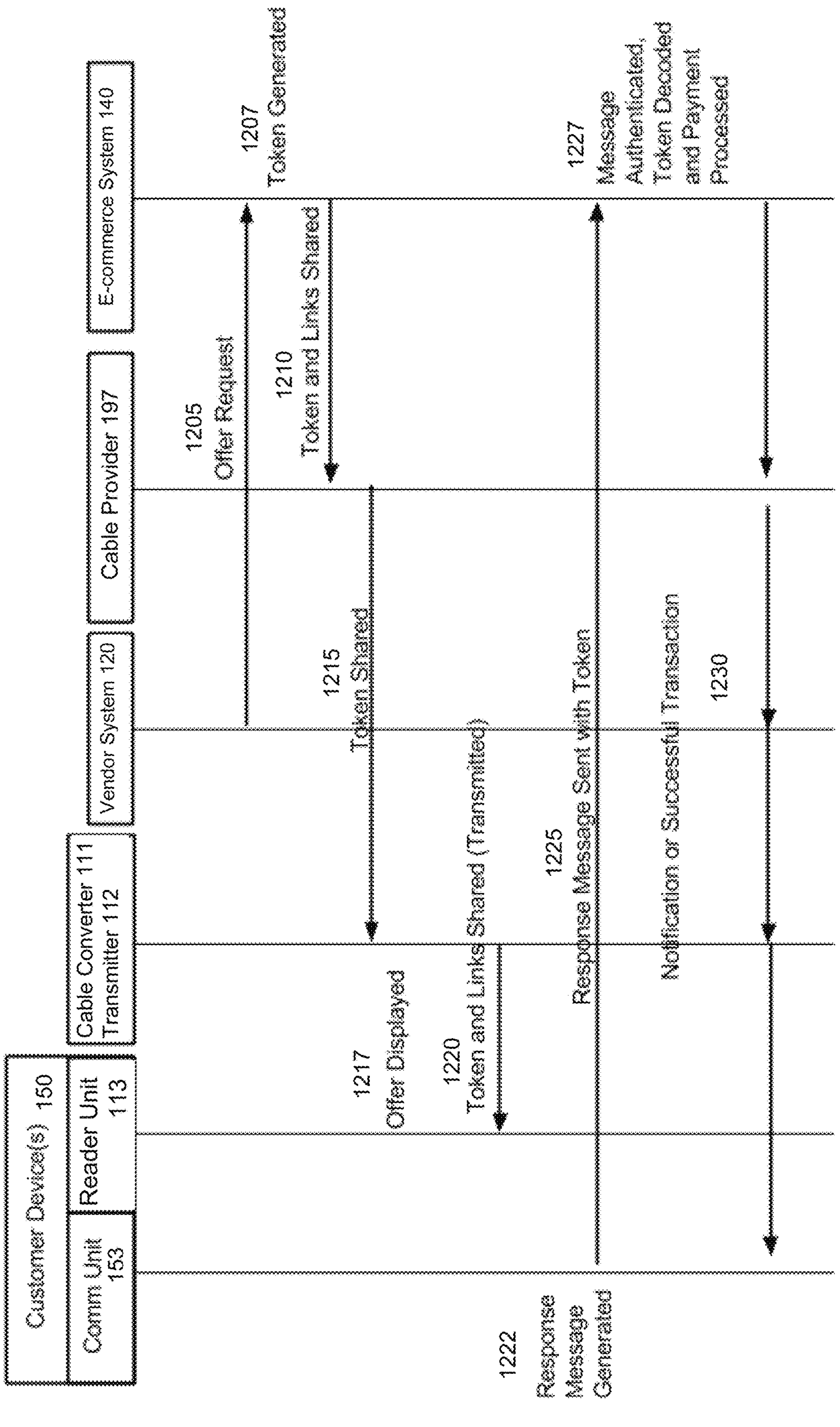
FIG. 12A is a transactional flow diagram that illustrates a method of messaging based payments with interactive cable television by an offer message presented by wireless signal.

FIG. 12A is a transactional flow diagram 1200 that illustrates a method of messaging based payments with interactive cable television by an offer message presented by wireless signal. There are a growing number of devices that link to cable provider systems 197 which work in tandem with interactive television sets. For example, game consoles, controllers, remotes, motion capture, mobile phones and tablets have an increasing level of integration with the television viewing experience. Cable television, video games, messaging and web-based viewing increasingly merge into a single experience. Disclosed is an invention that integrates multiple devices in messaging based payments among other forms of messaging. The token required for payment processing is delivered to the customer's cable box and transferred via a wireless transmission to the customer's personal mobile device, where they may complete the transaction by sending a message back to the e-commerce. This method has many benefits one of which is allowing multiple devices and multiple customers composing an audience whose spatial proximity falls within the range of the transmitter and may receive the same offer/token. It also adds added security utilizing multiple methods of communication.

Diagram 1200 includes vendor 120 requesting an offer from e-commerce system 140 for the purpose of a cable broadcast at step 1205. E-commerce system 140 generates the token associated with the amount to be paid by the customer at step 1207. This may be a token embedded in a mailto link or a short URL link that can request a token for payment processing.

E-commerce system 140 shares the token or link with the cable provider system 197 for use in programing at step 1210. The programming may include television programming and television broadcasts as well as streaming configurations. The token or short URL link is associated with a set of advertisements broadcast by the cable provider. Cable provider 197 facilitates a broadcast to their network of cable converters and shares the token and links to cable converter 111 at step 1215. An offer is viewed on a display unit such as a television at 1217. The television may not be associated with the customer's account. The television may be controlled by vendor 120 or other third party. The television may be a projector or other form of screening device like a video billboard. The cable converter and transmitter 112 transmits the token or link within a defined distance to customer device 150 via reader unit 113 at step 1220. In an implementation, this signal may include but is not limited to a radio signal, near field communication, infrared signal, Bluetooth or Wi-Fi signal. In this example, the transmission may include a mailto link with token.

The customer using the reader unit 113 receives the transmission triggering the opening of communication unit 153 on customer device 150. Alternatively, before communication unit 153 is opened, the customer may be required to accept the offer. Communication unit 153 generates of a response email message based on the transmitted mailto link with token at step 1222. In an implementation, communication unit 153 is an email client. The email message is addressed and sent to e-commerce system 140 with the token in the email at step 1125. The token may be anywhere in the email. The customer using communication unit 153 sends the email and shares the message with the e-commerce system 140. The process of selecting the offer and sending the email may be one process and not visible to the customer.

E-commerce system 140 authenticates the email message and decodes the token at step 1227. If requirements of authentication are not met, the customer may be sent a confirmation message or be sent a URL link that navigates them to a web page such as a signup URL and/or URL checkout. If requirements are met, then e-commerce system 140 shares a request for payment with the payment processor. If requirements are met, the payments are processed, updates and notifications are provided at step 1230. As an alternative, the offer message may require a process described in FIG. 10 where the offer has a short URL Link that requests the tokens required for payment processing.

Figure 12B:
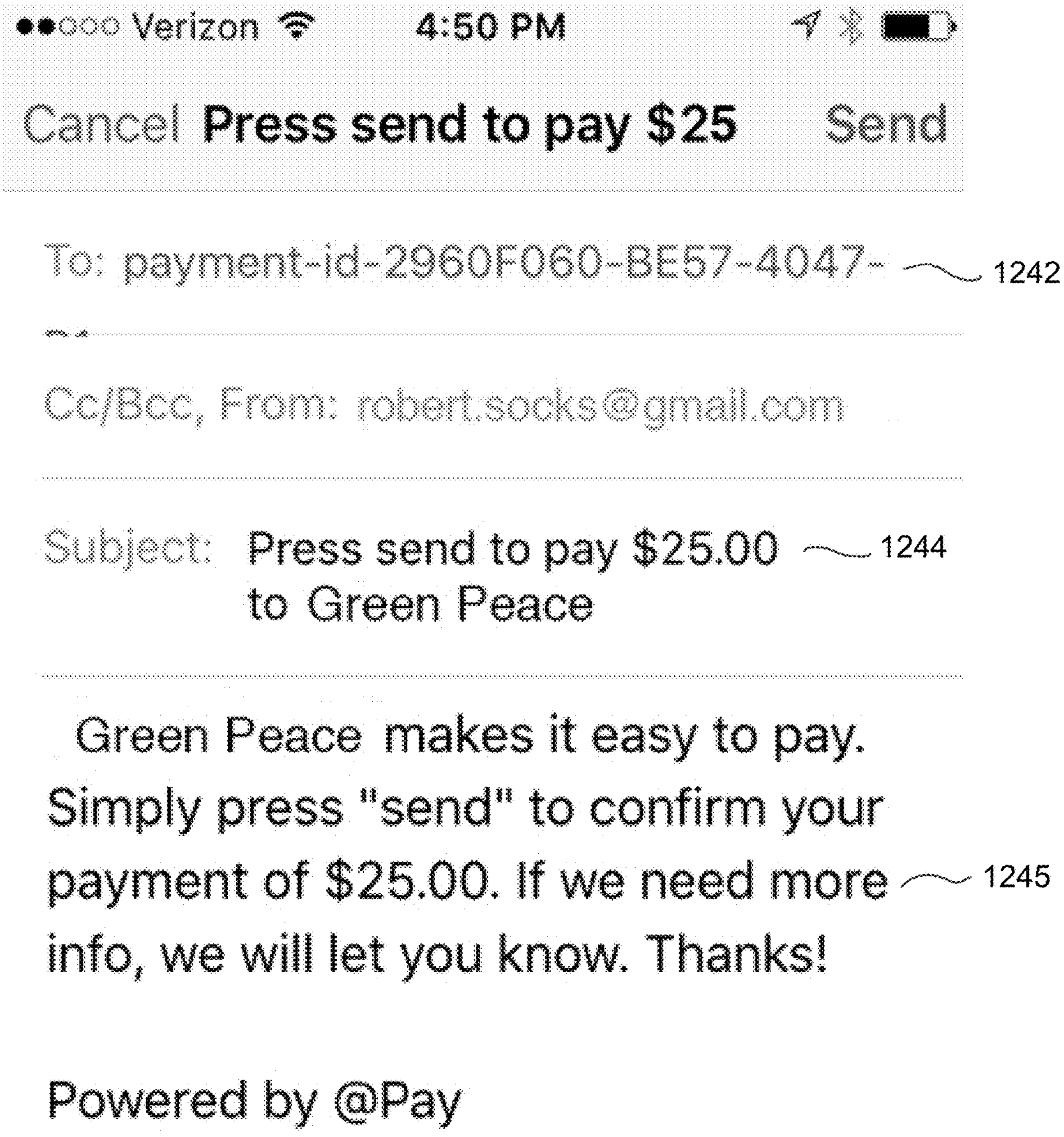
FIG. 12B is an example of a response email delivered by wireless signal.

FIG. 12B is an example of a response email 1240 delivered by wireless signal. Email 1240 is addressed to e-commerce system 140 and has the token 1242. The token may be anywhere in the email. In this example, the token is in the 'to' field. The mailto link may also provide additional messaging and instructions for the customer 1244, 1245. More than one customer may be able to generate a response email based on the transmission. The customer sends the email 1240 and shares the token with e-commerce system 140. The message may travel telephonically over another network or be transmitted back via the wireless transmission and the cable signal.

Figure 12C:
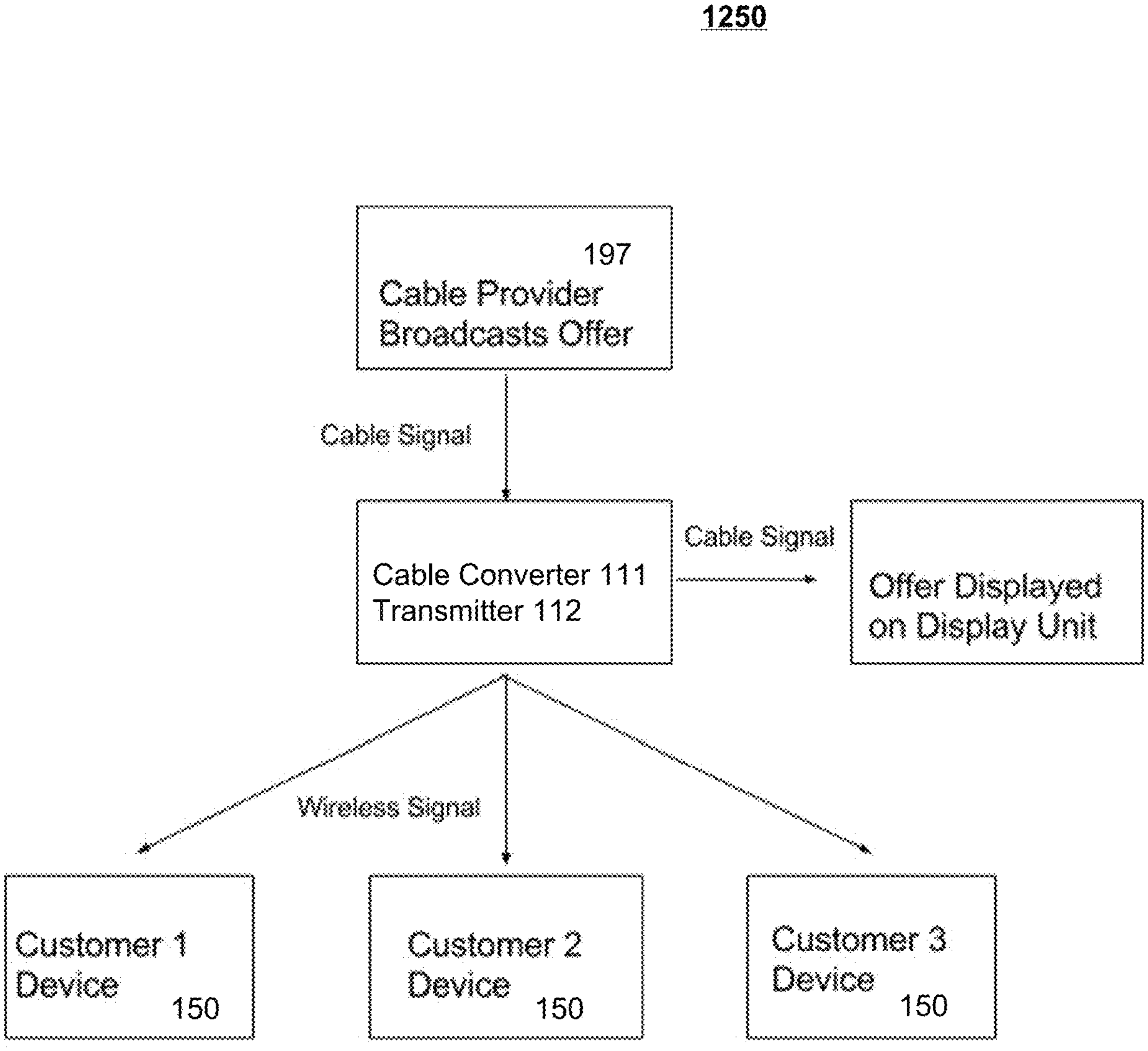
FIG. 12C is a diagram illustrating the differing types of signals utilized in the communication between cable provider and customer device.

FIG. 12C is a diagram 1250 illustrating the differing types of signals utilized in the communication between cable provider 197 and customer device 150. Cable provider broadcasts the offer via a cable signal that is decoded by a cable converter 111 or other cable device. The visual graphics or video are transmitted to the display unit. At the same time, cable converter 111 and transmitter transmits the offer message to the customer's device 150 over a wireless device. The wireless transmission feature allows more than one customer in the screening audience venue to receive the offer. The screening audience is defined within a viewing distance to a particular screen/transmitter. In the example, there are three separate customers depicted however any number of customers could be used.

Figure 12D:
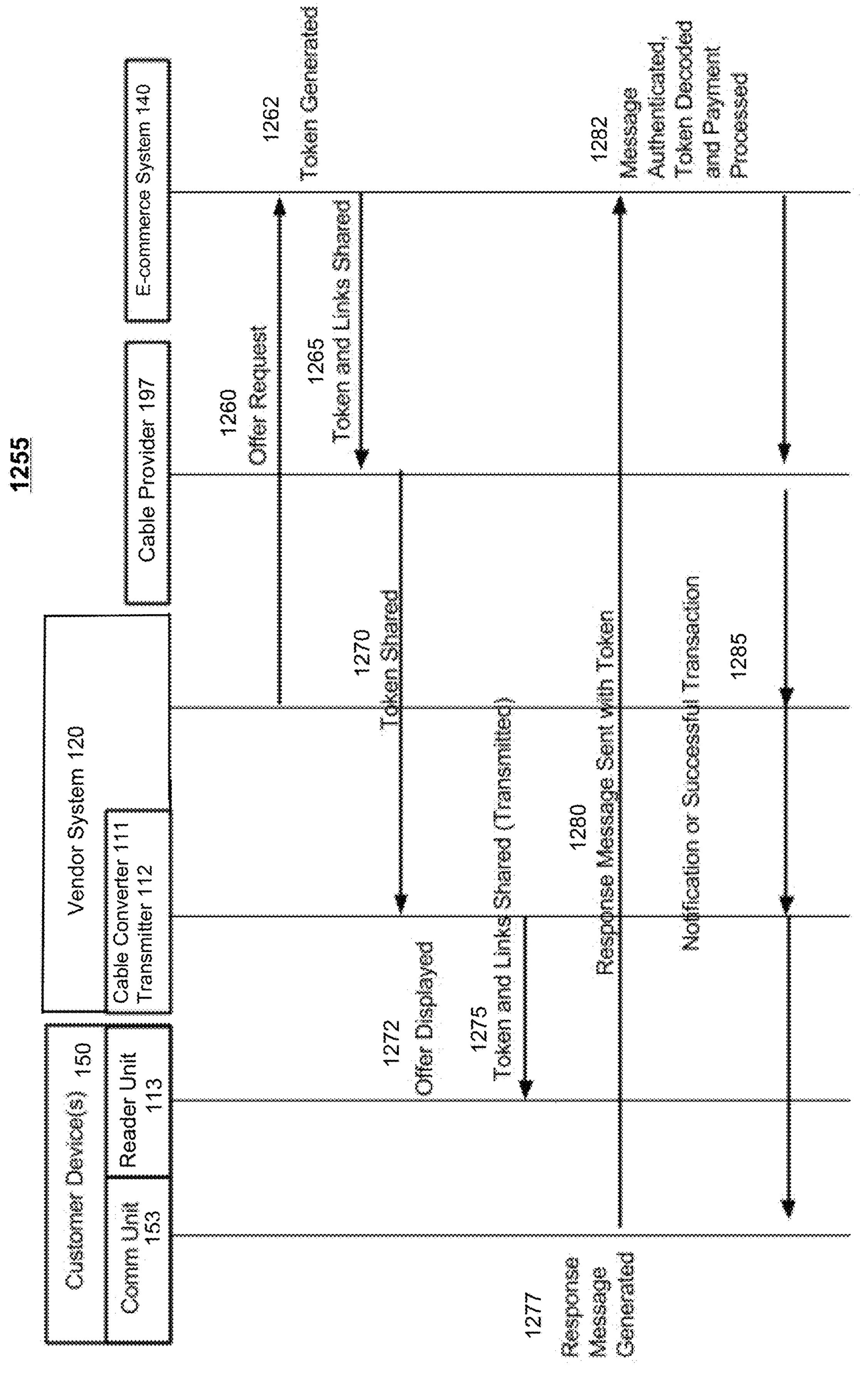
FIG. 12D is a transactional flow diagram that illustrates a method of messaging based payments with interactive cable television by an offer message presented by wireless signal where the cable converter/transmitter are within the vendor system.

FIG. 12D is a transactional flow diagram 1255 that illustrates a method of messaging based payments with interactive cable television by an offer message presented by wireless signal where the cable converter/transmitter are within the vendor system. There are a growing number of devices that link to cable provider systems 197 which work in tandem with interactive television sets as set forth above. Disclosed is an invention that integrates multiple devices in messaging based payments among other forms of messaging. The token required for payment processing is delivered to the customer's cable box and transferred via a wireless transmission to the customer's personal mobile device, where they may complete the transaction by sending a message back to the e-commerce. This method has many benefits one of which is allowing multiple devices and multiple customers composing an audience whose spatial proximity falls within the range of the transmitter and may receive the same offer/token. It also adds added security utilizing multiple methods of communication.

Diagram 1255 includes vendor 120 requesting an offer from e-commerce system 140 for the purpose of a cable broadcast at step 1260. In an implementation vendor 120 is the vendor that subsequently displays the offer. In an alternate implementation, vendor 120 is not the vendor that subsequently displays the offer. E-commerce system 140 generates the token associated with the amount to be paid by the customer at step 1262. This may be a token embedded in a mailto link or a short URL link that can request a token for payment processing.

E-commerce system 140 shares the token or link with the cable provider system 197 for use in programing at step 1265. The programming may include television programming and television broadcasts as well as streaming configurations. The token or short URL link is associated with a set of advertisements broadcast by the cable provider. Cable provider 197 facilitates a broadcast to their network of cable converters and shares the token and links to cable converter within vendor system 120 at step 1270. An offer is viewed on a display unit such as a television at 1272. The television may not be associated with the customer's account. The television may be controlled by vendor 120 or other third party. The television may be a projector or other form of screening device like a video billboard. The cable converter and transmitter 112 transmits the token or link within a defined distance to customer device 150 via reader unit 113 at step 1275. In an implementation, this signal may include but is not limited to a radio signal, near field communication, infrared signal, Bluetooth or Wi-Fi signal. In this example, the transmission may include a mailto link with token.

The customer using the reader unit 113 receives the transmission triggering the opening of communication unit 153 on customer device 150. Alternatively, before communication unit 153 is opened, the customer may be required to accept the offer. Communication unit 153 generates of a response email message based on the transmitted mailto link with token at step 1277. In an implementation, communication unit 153 is an email client. The email message is addressed and sent to e-commerce system 140 with the token in the email at step 1280. The token may be anywhere in the email. The customer using communication unit 153 sends the email and shares the message with the e-commerce system 140. The process of selecting the offer and sending the email may be one process and not visible to the customer.

E-commerce system 140 authenticates the email message and decodes the token at step 1282. If requirements of authentication are not met, the customer may be sent a confirmation message or be sent a URL link that navigates them to a web page such as a signup URL and/or URL checkout. If requirements are met, then e-commerce system 140 shares a request for payment with the payment processor. If requirements are met, the payments are processed, updates and notifications are provided at step 1285. As an alternative, the offer message may require a process described in FIG. 10 where the offer has a short URL Link that requests the tokens required for payment processing.

Figure 13:
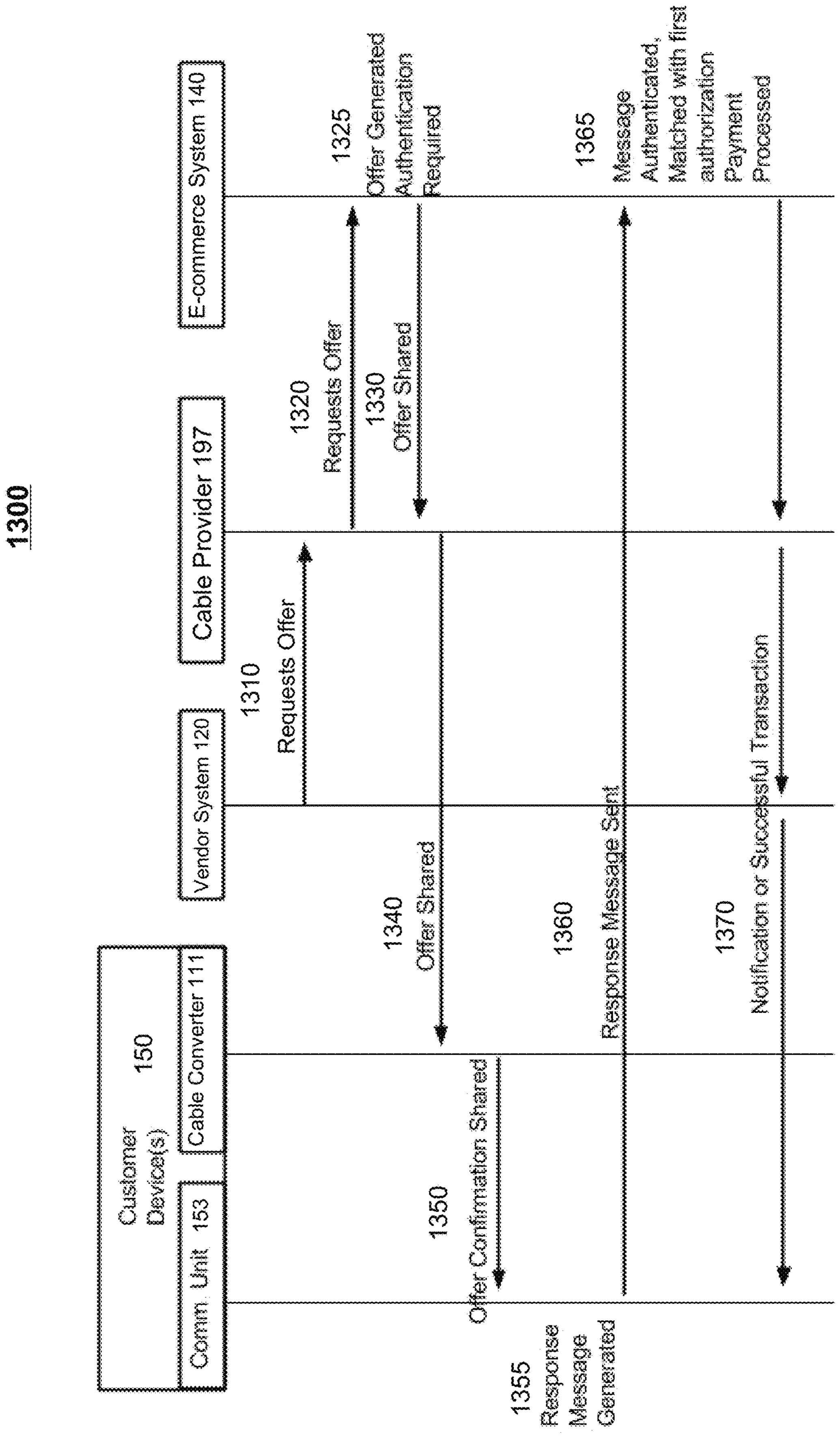
FIG. 13 is a transactional flow diagram that illustrates a method of messaging based payments with interactive cable television by an offer message presented by cable provider that facilitates a customer payment response message that authenticates without a token.

FIG. 13 is a transactional flow diagram 1300 that illustrates a method of messaging based payments with interactive cable television by an offer message presented by cable provider 197 that facilitates a customer payment response message that authenticates without a token. Vendor 120 requests from cable provider 197 a promotion of an offer for a product, service, or donation at step 1310. Cable provider 197 requests from e-commerce system 140 an offer 1320. Although this request is coming from cable provider 197, it may also come from vendor 120. E-commerce system 140 generates at step 1325 the offer based on information provided by cable provider 197 and/or vendor 120. E-commerce system 140 generates an email address associated with the vendor's 120 offer. This email address may be included in a mailto link. It may also be in an alternative form, for example (not pictured), the use of a short URL. The mailto link may be associated with a shortened URL or some corresponding trigger in the cable provider system that is used in place of the mailto link. The mailto link may be embedded behind an image.

E-commerce system 140 shares at step 1330 the message, including the mailto link, with cable provider 197. Cable provider 197 generates the promotional offer, which is aired and may be accessed by the viewer. This may be a request where the customer can access more information or other actions such as payment messaging. Cable provider 197 shares the information with the customer's cable converter 111 at step 1340.

The customer, using customer device 150, accesses this promotion offer using cable converter 111. The access to cable converter 111 may also be added by another device, including, but not limited to a remote control, keyboard, video game console, laptop, or tablet. The customer views the offer on a display unit such as a television. There may be more than one offer. The customer selects an offer. The selection of the mailto link triggers the opening of communication unit 153 at step 1350 and generates the response email at step 1355. This may appear on the display unit screen or on another device connected to the display unit and cable converter or router. This may require entering an email address or only clicking a request. The email message is addressed to e-commerce system 140. The address may be a reply-to button and not a mailto link. The address may be accompanied by other addresses in other fields for authentication purposes. The customer may not need to select a mailto link to generate the message with the required address, but may enter the address manually based on instructions.

Alternatively, the user may use an application such as a Quick Response (QR), barcode or Near Field Communication (NFC) reader to generate the response message. The customer using the communication unit 153 shares the message with e-commerce system 140 at step 1360. The process of selecting the offer and sending the email may be an automatic process and not visible to the customer.

E-commerce system 140 authenticates the email message and identifies the offer details, vendor, and cable provider based on the email address the customer sends to and from at step 1365. If requirements of authentication are not met, the customer may be sent a confirmation message or a URL link that navigates them to a web page such as a signup URL or URL checkout. If requirements are met, then e-commerce system 140 shares a request for payment with the payment processor. The payments are processed and updates and notifications are sent out at step 1370.

The above-disclosed invention presents variations on methodology to provide message-based checkout in a cable television or interactive television environment. Varying levels of convergence between Internet and cable television signals may require different messaging or a combination of messaging. Although the above examples use a cable converter the cable converter may be combined with other functions like a router, video game console, computer, phone, tablet, digital video recorder or digital media player set-top box. Although the above examples explain how offers are sent to converter boxes, the offers and transactions are limited to the holder of the cable account but many of these designs are directed to anyone viewing the television. Viewers may respond by adding email addresses or phone numbers of signing into social media accounts as method of making a request or payment of the e-commerce system.

What is claimed is:

1. A method for improving security and integrity of email-based payments in an interactive television environment by enforcing domain-authenticated messaging and registry-based token resolution, the method comprising:

receiving, by an e-commerce system, a request for an offer message from a user via a cable provider system;

creating, by the e-commerce system, a token-registry entry in a token registry, wherein the token-registry entry associates a short lookup token with a corresponding long token, and wherein the corresponding long token includes an IP-address parameter identifying an IP address of a token recipient;

generating, by the e-commerce system, the offer message including a mailto link, wherein the mailto link includes a recipient address having a local-part that includes the short lookup token;

causing, by the e-commerce system, the offer message to be displayed to the user, wherein the mailto link is embedded in an image;

receiving, by the e-commerce system, a response message from the user, wherein the response message is generated when the user selects the mailto link;

authenticating, by the e-commerce system, the response message by verifying a DomainKeys Identified Mail (DKIM) signature in a header of the response message using a public key retrieved from a Domain Name System (DNS) record for a signing domain identified from the response message, and determining that the response message satisfies a Sender Policy Framework (SPF) check;

resolving, by the e-commerce system, the short lookup token by parsing a recipient address field of the response message to extract the short lookup token from a local-part of an address in the recipient address field, wherein the recipient address field comprises a To, CC, or BCC field, and using the short lookup token to access the corresponding long token in the token registry;

decoding, by a token decoder of the e-commerce system, the corresponding long token; and processing, by the e-commerce system, the payment only upon the authenticating, the using of the short lookup token to access the corresponding long token, and the decoding of the corresponding long token.

2. The method of claim 1, wherein the authenticating of the response message is based on an address where the response message originated.

3. The method of claim 1, wherein the user is a customer using a customer device.

4. The method of claim 1, wherein for a negatively authenticated message providing a sender of the message a sign-up to enable positive authentication.

5. The method of claim 4, wherein the sign-up is a provided Universal Resource Locator (URL) link.

6. The method of claim 1, wherein creating the token-registry entry comprises storing the corresponding long token together with a reference to the short lookup token and an identifier of the offer.

7. The method of claim 1, further comprising rejecting the response message when the DKIM verification fails, when the SPF check fails, when the short lookup token does not access the corresponding long token in the token registry, or when the token decoder fails to decode the corresponding long token.

8. The method of claim 1, wherein receiving the request for the offer message comprises receiving, from the cable provider system, a customer identifier entered by the user through an interactive television interface associated with a cable converter.

9. The method of claim 8, wherein the customer identifier comprises an email address, a telephone number, or a social-media identifier associated with a customer device of the user.

10. The method of claim 8, wherein generating the offer message comprises addressing the offer message to a customer device associated with the customer identifier such that a user of the customer device can complete the payment without using an account of a subscriber associated with the cable provider system.

11. The method of claim 1, wherein causing the offer message to be displayed comprises causing a cable converter, a display device, or a transmitter associated with the cable converter or the display device to locally transmit the mailto link or the short lookup token to a customer device using near-field communication, infrared communication, Bluetooth communication, Wi-Fi communication, or radio-frequency communication.

12. The method of claim 11, wherein the response message is generated by a communication unit of the customer device after the customer device receives the mailto link or the short lookup token from the cable converter, the display device, or the transmitter.

13. A method for improving security and integrity of email-based payments in an interactive television environment by enforcing domain-authenticated messaging and registry-based token resolution when a vendor initiates an offer, the method comprising:

receiving, by an e-commerce system, a request for an offer message from a vendor via a cable provider system;

creating, by the e-commerce system, a token-registry entry in a token registry, wherein the token-registry entry associates a short lookup token with a corresponding long token, and wherein the corresponding long token includes an IP-address parameter identifying an IP address of a token recipient;

generating, by the e-commerce system, the offer message including a mailto link, wherein the mailto link includes a recipient address having a local-part that includes the short lookup token;

sending, by the e-commerce system, the offer message to the cable provider system for presentation to users, wherein the mailto link is embedded in an image;

receiving, by the e-commerce system, a response message from a customer, wherein the response message is generated when the customer selects the mailto link in the offer message;

authenticating, by the e-commerce system, the response message by verifying a DomainKeys Identified Mail (DKIM) signature in a header of the response message using a public key retrieved from a Domain Name System (DNS) record for a signing domain identified from the response message, and determining that the response message satisfies a Sender Policy Framework (SPF) check;

resolving, by the e-commerce system, the short lookup token by parsing a recipient address field of the response message to extract the short lookup token from a local-part of an address in the recipient address field, wherein the recipient address field comprises a To, CC, or BCC field, and using the short lookup token to access the corresponding long token in the token registry;

decoding, by a token decoder of the e-commerce system, the corresponding long token; and processing, by the e-commerce system, the payment only upon the authenticating, the using of the short lookup token to access the corresponding long token, and the decoding of the corresponding long token.

14. The method of claim 13, wherein the authenticating of the response message is based on an address where the response message originated.

15. The method of claim 13 wherein the user is a customer using a customer device.

16. The method of claim 13, wherein for a negatively authenticated message providing a sender of the message a sign-up to enable positive authentication.

17. The method of claim 16, wherein the sign-up is a provided Universal Resource Locator (URL) link.

18. The method of claim 13, wherein creating the token-registry entry comprises storing the corresponding long token together with a reference to the short lookup token and an identifier of the offer.

19. The method of claim 13, further comprising rejecting the response message when the DKIM verification fails, when the SPF check fails, when the short lookup token does not access the corresponding long token in the token registry, or when the token decoder fails to decode the corresponding long token.

20. A non-transitory computer readable storage medium storing instructions for improving security and integrity of email-based payments in an interactive television environment by enforcing domain-authenticated messaging and registry-based token resolution, the instructions when executed by a processor of an e-commerce system cause the processor to perform a method comprising:

receiving a request for an offer message from a user via a cable provider system;

creating a token-registry entry in a token registry, wherein the token-registry entry associates a short lookup token with a corresponding long token, and wherein the corresponding long token includes an IP-address parameter identifying an IP address of a token recipient;

generating the offer message including a mailto link, wherein the mailto link includes a recipient address having a local-part that includes the short lookup token;

causing the offer message to be displayed to the user, wherein the mailto link is embedded in an image;

receiving a response message from the user, wherein the response message is generated when the user selects the mailto link;

authenticating the response message by verifying a DomainKeys Identified Mail (DKIM) signature in a header of the response message using a public key retrieved from a Domain Name System (DNS) record for a signing domain identified from the response message, and determining that the response message satisfies a Sender Policy Framework (SPF) check;

resolving the short lookup token by parsing a recipient address field of the response message to extract the short lookup token from a local-part of an address in the recipient address field, wherein the recipient address field comprises a To, CC, or BCC field, and using the short lookup token to access the corresponding long token in the token registry;

decoding, by a token decoder of the e-commerce system, the corresponding long token; and processing the payment only upon the authenticating, the using of the short lookup token to access the corresponding long token, and the decoding of the corresponding long token.

* * * * *